(12) United States Patent
Hong et al.

(10) Patent No.: US 11,994,612 B2
(45) Date of Patent: *May 28, 2024

(54) SYSTEMS AND METHODS FOR PHASE-MODULATED RADAR DETECTION

(71) Applicant: Oculii Corp., Beavercreek, OH (US)

(72) Inventors: Lang Hong, Beavercreek, OH (US); Steven Hong, Beavercreek, OH (US)

(73) Assignee: Oculii Corp., Beavercreek, OH (US)

( * ) Notice: Subject to any disclaimer, the term of this patent is extended or adjusted under 35 U.S.C. 154(b) by 487 days.

This patent is subject to a terminal disclaimer.

(21) Appl. No.: 17/324,963

(22) Filed: May 19, 2021

(65) Prior Publication Data

US 2022/0163624 A1    May 26, 2022

Related U.S. Application Data

(63) Continuation of application No. 17/125,122, filed on Dec. 17, 2020, now Pat. No. 11,041,940.

(Continued)

(51) Int. Cl.
| | |
|---|---|
| *G01S 7/35* | (2006.01) |
| *G01S 13/26* | (2006.01) |
| *G01S 13/32* | (2006.01) |
| *G01S 13/58* | (2006.01) |
| *H04B 7/0413* | (2017.01) |

(52) U.S. Cl.
CPC ............ *G01S 7/354* (2013.01); *G01S 13/325* (2013.01); *G01S 7/356* (2021.05); *G01S 13/26* (2013.01); *G01S 13/582* (2013.01); *G01S 13/584* (2013.01); *H04B 7/0413* (2013.01)

(58) Field of Classification Search
CPC ...... G01S 13/931; G01S 13/42; G01S 13/584; G01S 13/343; G01S 13/325; G01S 7/282; G01S 13/878; G01S 13/582; G01S 7/352; H04B 7/0413; H04B 7/0691;

(Continued)

(56) References Cited

U.S. PATENT DOCUMENTS

| | | |
|---|---|---|
| 3,691,560 A | 9/1972 | Iammack |
| 3,978,482 A | 8/1976 | Williams et al. |

(Continued)

FOREIGN PATENT DOCUMENTS

| | | |
|---|---|---|
| CN | 206515399 U | 9/2017 |
| EP | 3816665 A1 | 5/2021 |

(Continued)

OTHER PUBLICATIONS

Holder, Martin, et al., "Real-Time Graph SLAM based on Radar", IEEE Intelligent Vehicles Symposium (IV), Paris, France, Jun. 9-12, 2019.

(Continued)

*Primary Examiner* — Olumide Ajibade Akonai
(74) *Attorney, Agent, or Firm* — Maiorana Patent Law, PA

(57) ABSTRACT

A system for phase-modulated radar detection, preferably including one or more transmitter arrays, receiver arrays, and signal processors. A method for phase-modulated radar detection, preferably including transmitting a set of probe signals, receiving a set of reflected probe signals, and/or decoding the set of received probe signals, and optionally including evaluating effects of phase variance and/or modifying probe signal characteristics.

20 Claims, 26 Drawing Sheets

Related U.S. Application Data

(60) Provisional application No. 62/958,920, filed on Jan. 9, 2020, provisional application No. 62/952,026, filed on Dec. 20, 2019.

(58) Field of Classification Search
CPC ...... H04B 7/2628; H01Q 21/06; H01Q 21/08; H01Q 1/3233; H01Q 21/065; H01Q 3/2617
See application file for complete search history.

(56) References Cited

U.S. PATENT DOCUMENTS

| | | | |
|---|---|---|---|
| 4,042,927 A | 8/1977 | Helms | |
| 4,084,158 A | 4/1978 | Slawsby | |
| 4,246,585 A | 1/1981 | Mailloux | |
| 4,544,927 A | 10/1985 | Kurth et al. | |
| 4,546,355 A | 10/1985 | Boles | |
| 4,717,916 A | 1/1988 | Adams et al. | |
| 4,723,124 A | 2/1988 | Boles | |
| 4,794,395 A | 12/1988 | Cindrich et al. | |
| 4,996,532 A | 2/1991 | Kirimoto et al. | |
| 5,218,359 A | 6/1993 | Minamisono | |
| 5,225,839 A | 7/1993 | Okurowski et al. | |
| 5,278,757 A | 1/1994 | Hoctor et al. | |
| 5,847,673 A | 12/1998 | Debell | |
| 5,945,926 A | 8/1999 | Ammar et al. | |
| 7,535,409 B1 | 5/2009 | Choe et al. | |
| 7,609,198 B2 | 10/2009 | Chang | |
| 8,269,137 B2 | 9/2012 | Ehrmann et al. | |
| 8,312,771 B2 | 11/2012 | Randall et al. | |
| 8,482,455 B2 | 7/2013 | Kemkemian et al. | |
| 9,103,671 B1 | 8/2015 | Breed et al. | |
| 9,470,782 B2 | 10/2016 | Millar et al. | |
| 9,541,638 B2 | 1/2017 | Jansen et al. | |
| 9,869,762 B1 | 1/2018 | Alland et al. | |
| 10,048,366 B1 | 8/2018 | Hong et al. | |
| 10,359,512 B1 | 7/2019 | Hong et al. | |
| 10,509,119 B2 | 12/2019 | Hong et al. | |
| 10,812,154 B1* | 10/2020 | Elad | G01S 13/931 |
| 11,041,940 B1* | 6/2021 | Hong | G01S 7/354 |
| 2002/0180636 A1 | 12/2002 | Lin et al. | |
| 2004/0178951 A1 | 9/2004 | Ponsford et al. | |
| 2007/0013575 A1 | 1/2007 | Lee et al. | |
| 2007/0285315 A1 | 12/2007 | Davis et al. | |
| 2008/0122681 A1 | 5/2008 | Shirakawa | |
| 2008/0159416 A1 | 7/2008 | Melick et al. | |
| 2008/0250875 A1 | 10/2008 | Khosla et al. | |
| 2008/0291077 A1 | 11/2008 | Chang | |
| 2009/0135046 A1 | 5/2009 | Steele et al. | |
| 2009/0174590 A1 | 7/2009 | Huizing et al. | |
| 2009/0201206 A1 | 8/2009 | Li et al. | |
| 2009/0231181 A1 | 9/2009 | Yannone | |
| 2010/0019954 A1 | 1/2010 | Mizutani et al. | |
| 2010/0156701 A1 | 6/2010 | Shirakawa | |
| 2010/0194629 A1 | 8/2010 | Craig et al. | |
| 2010/0220001 A1 | 9/2010 | Longstaff | |
| 2010/0328157 A1 | 12/2010 | Culkin et al. | |
| 2011/0050500 A1 | 3/2011 | Shirakawa | |
| 2011/0241928 A1 | 10/2011 | Oswald et al. | |
| 2011/0298676 A1 | 12/2011 | Yanagihara et al. | |
| 2012/0001791 A1 | 1/2012 | Wintermantel | |
| 2012/0112954 A1 | 5/2012 | Kurono et al. | |
| 2012/0268309 A1 | 10/2012 | Samuel et al. | |
| 2012/0299773 A1 | 11/2012 | Stirling-Gallacher et al. | |
| 2013/0069818 A1 | 3/2013 | Shirakawa et al. | |
| 2013/0120191 A1 | 5/2013 | Zhang et al. | |
| 2013/0300596 A1 | 11/2013 | Shirakawa | |
| 2014/0197984 A1 | 7/2014 | Wang et al. | |
| 2014/0266898 A1 | 9/2014 | Linnenbrink | |
| 2015/0102954 A1 | 4/2015 | Hong | |
| 2015/0270609 A1 | 9/2015 | Jin | |
| 2016/0069994 A1 | 3/2016 | Allen et al. | |
| 2016/0291130 A1 | 10/2016 | Ginsburg et al. | |
| 2017/0031013 A1 | 2/2017 | Halbert et al. | |
| 2017/0082730 A1 | 3/2017 | Kishigami et al. | |
| 2017/0141454 A1 | 5/2017 | Welle | |
| 2017/0212213 A1 | 7/2017 | Kishigami | |
| 2017/0315229 A1 | 11/2017 | Pavek et al. | |
| 2018/0024235 A1 | 1/2018 | Hong et al. | |
| 2018/0088224 A1 | 3/2018 | Kishigami | |
| 2019/0018128 A1 | 1/2019 | Shollenberger | |
| 2019/0212430 A1 | 7/2019 | Akamine et al. | |
| 2019/0265347 A1 | 8/2019 | Wintermantel | |
| 2019/0293787 A1 | 9/2019 | Sakai et al. | |
| 2019/0324133 A1 | 10/2019 | Hong et al. | |
| 2019/0339374 A1 | 11/2019 | Kageme et al. | |
| 2019/0386712 A1 | 12/2019 | Fang | |
| 2020/0025914 A1 | 1/2020 | Li et al. | |
| 2020/0081110 A1 | 3/2020 | Nam et al. | |
| 2020/0191930 A1 | 6/2020 | Yunck | |
| 2020/0191939 A1 | 6/2020 | Wu et al. | |
| 2020/0191940 A1 | 6/2020 | Wu et al. | |
| 2020/0200892 A1 | 6/2020 | Rajab et al. | |
| 2021/0173042 A1* | 6/2021 | Wu | G01S 13/584 |
| 2021/0302560 A1* | 9/2021 | Kishigami | G01S 13/5246 |
| 2022/0221569 A1* | 7/2022 | Wang | G01S 13/58 |

FOREIGN PATENT DOCUMENTS

| | | | | |
|---|---|---|---|---|
| JP | 2008292264 A | | 12/2008 | |
| JP | 2013068433 A | | 4/2013 | |
| WO | WO-2009036507 A1 * | 3/2009 | | G01S 13/003 |
| WO | 2019215734 A1 | | 11/2019 | |

OTHER PUBLICATIONS

Lupfer, Stefanie, et al., "Increasing FastSLAM Accuracy for Radar Data by Integrating the Doppler Information", 2017 IEEE MIT-S International Conference on Microwaves for Intelligent Mobility (ICMIM).

International Search Report and Written Opinion for PCT Application No. PCT/US17/46708 dated Nov. 13, 2017.

International Search Report for PCT Application No. PCT/US18/15873 dated May 8, 2018.

International Search Report and Written Opinion dated Oct. 4, 2019 for Application No. PCT/US2019/40696.

Gonzalez, Hector A., et al., "Doppler Ambiguity Resolution for Binary-Phase-Modulated MIMO FMCW Radars, 2019 International Radar Conference, Sep. 23-27, 2019."

Hott, Maurice, et al., "Joint Super-Resolution and Array Interpolation for MIMO Radar Virtual Arrays", Proceedings of the 15th European Radar Conference, Sep. 26-28, 2018, Madrid, Spain.

Kellner, Dominik, et al., "Instantaneous Ego-Motion Estimation using Multiple Doppler Radars", 2014 IEEE International Conference on Robotics & Automation (ICRA) Hong Kong Convention and Exhibition Center May 31-Jun. 7, 2014, Hong Kong, China.

Li, et al., "Target Tracking in Uncertain Multipath Environment using Distributed Angle-of-Arrival Observation", retrieved from online on April 4, 201 (Apr. 4, 2018); retrieved from URL:http://ieeexplore.ieee.org/document/7131228.

Rapp, Matthias, et al., "A Fast Probabilistic Ego-Motion Estimation Framework for Radak", 2015 European Conference on Mobile Robotics.

Sun, Hongbo, et al., "Analysis and Comparison of MIMO Radar Waveforms", 2014 International Radar Conference, Oct. 13-17, 2014.

* cited by examiner

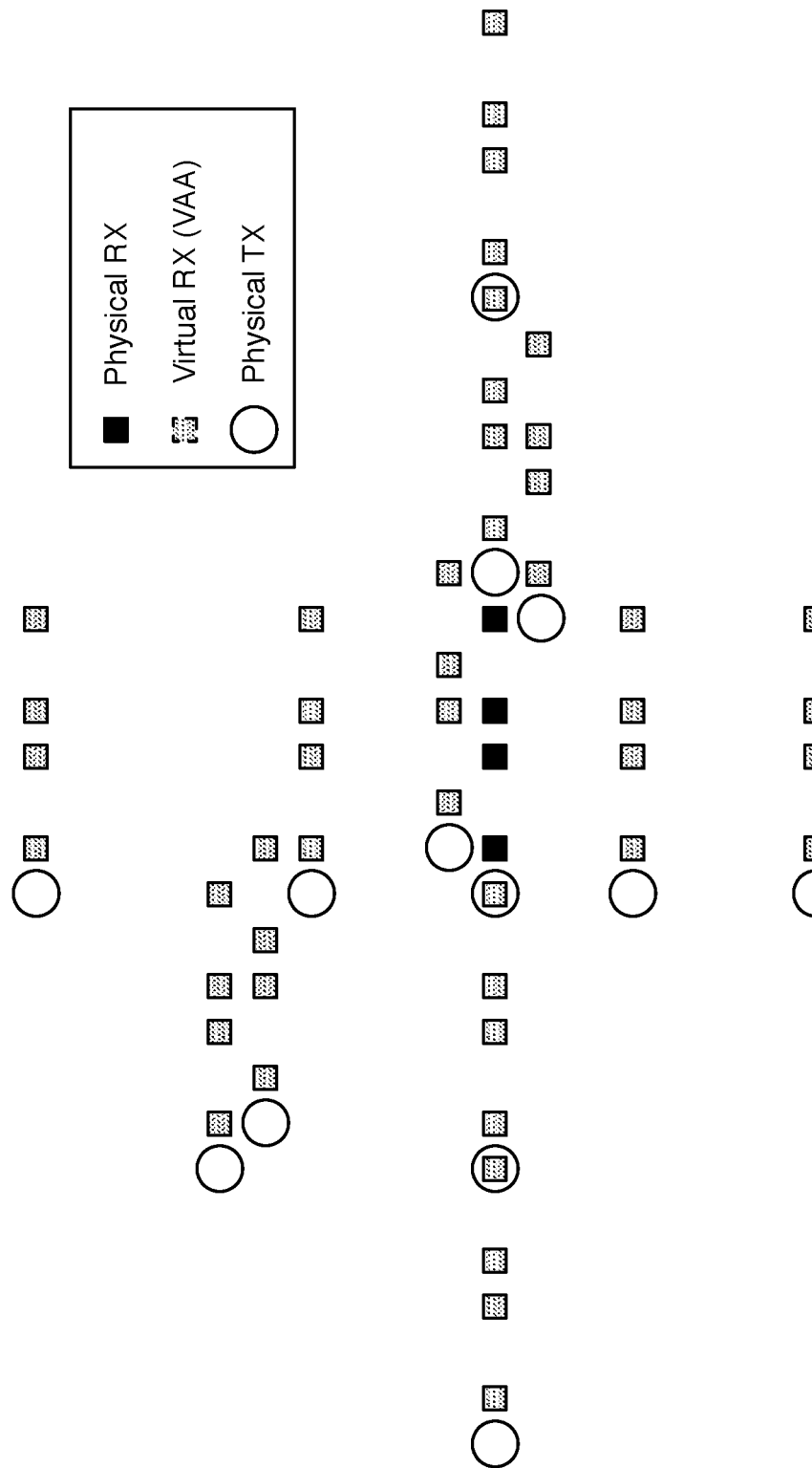

SYSTEMS AND METHODS FOR PHASE-MODULATED RADAR DETECTION

CROSS-REFERENCE TO RELATED APPLICATIONS

This application is a continuation of U.S. application Ser. No. 17/125,122, filed 17 Dec. 2020, which claims the benefit of U.S. Provisional Application Ser. No. 62/952,026, filed on 20, Dec. 2019, and of U.S. Provisional Application Ser. No. 62/958,920, filed on 9, Jan. 2020, each of which is incorporated in its entirety by this reference.

TECHNICAL FIELD

This invention relates generally to the radar field, and more specifically to new and useful systems and methods for phase-modulated radar detection.

BACKGROUND

Typical MIMO radar systems and methods can suffer from limited angle resolution and/or can require complex, expensive hardware. Thus, there is a need in the radar field to create new and useful systems and methods for phase-modulated radar detection.

BRIEF DESCRIPTION OF THE FIGURES

FIGS. 11A-11B are schematic representations of a seventh and eighth example, respectively, of virtual aperture radar detection, depicting a pre-interpolation virtual aperture.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 2A:
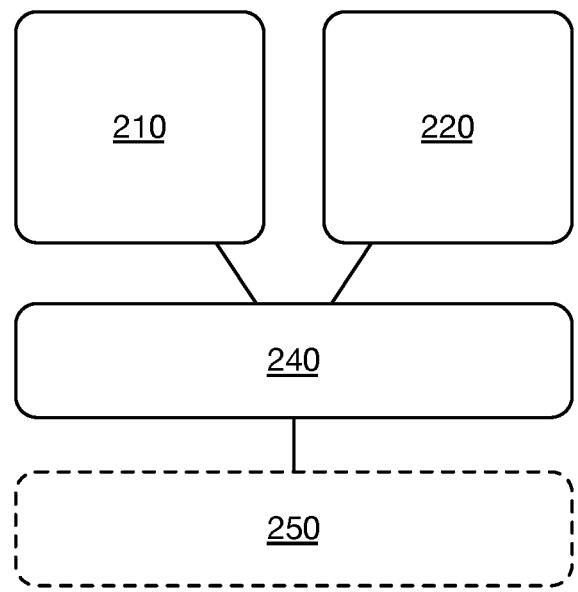
FIG. 2A is a schematic representation of an embodiment of the system.
Figure 2B:
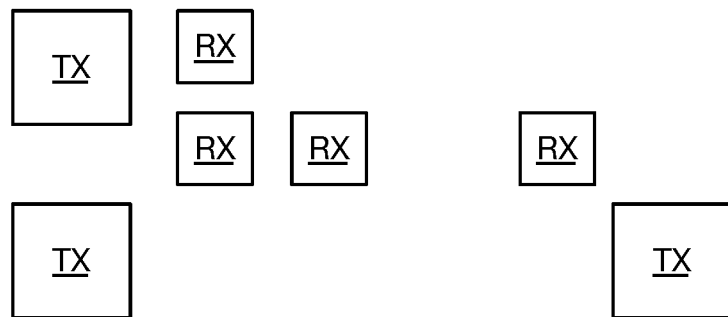
FIG. 2B is a schematic representation of an example of transmitter and receiver arrays of the system.
Figure 2C:
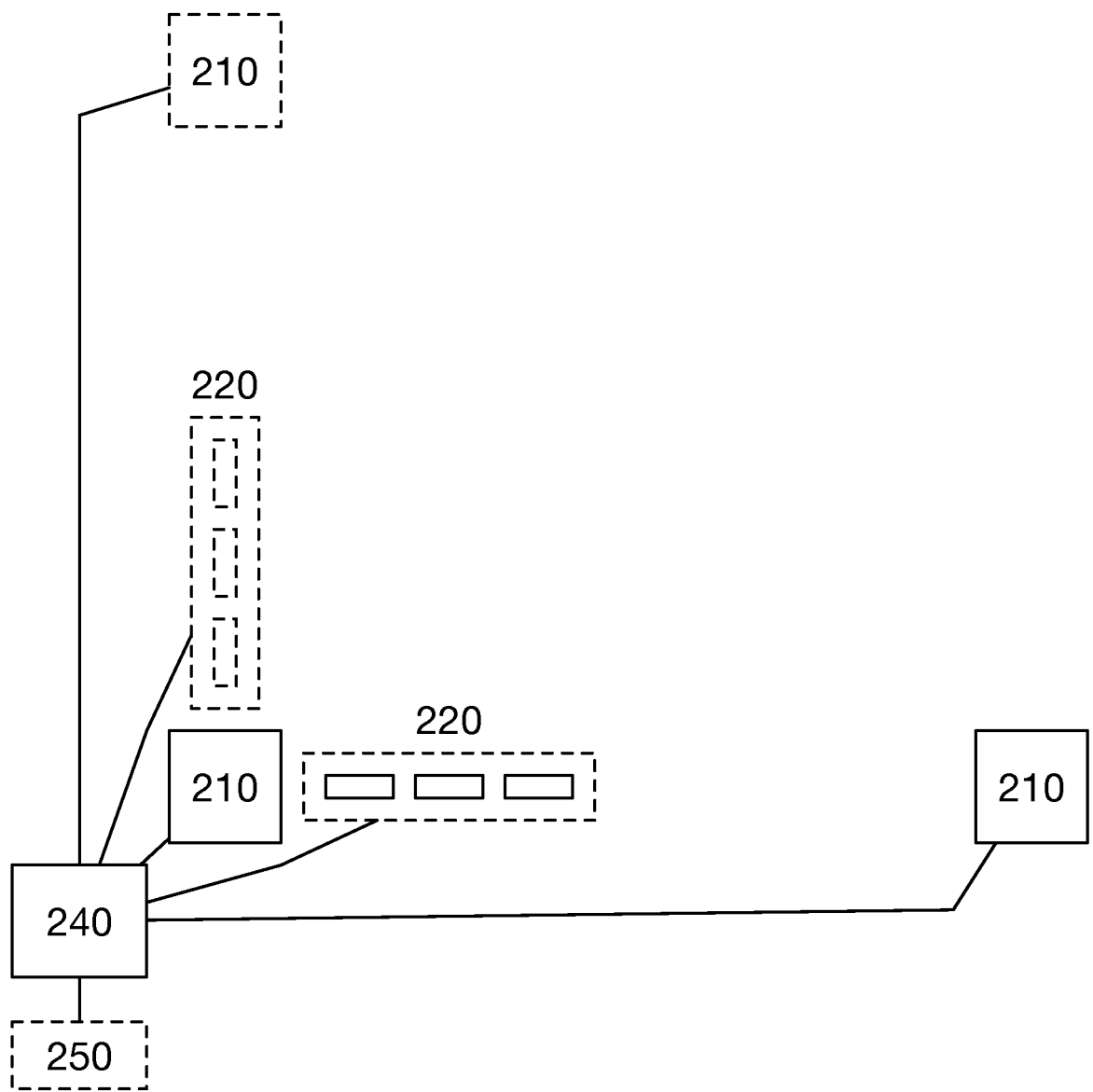
FIGS. 2C-2D are schematic representations of a first and second example, respectively, of the system.
Figure 2D:
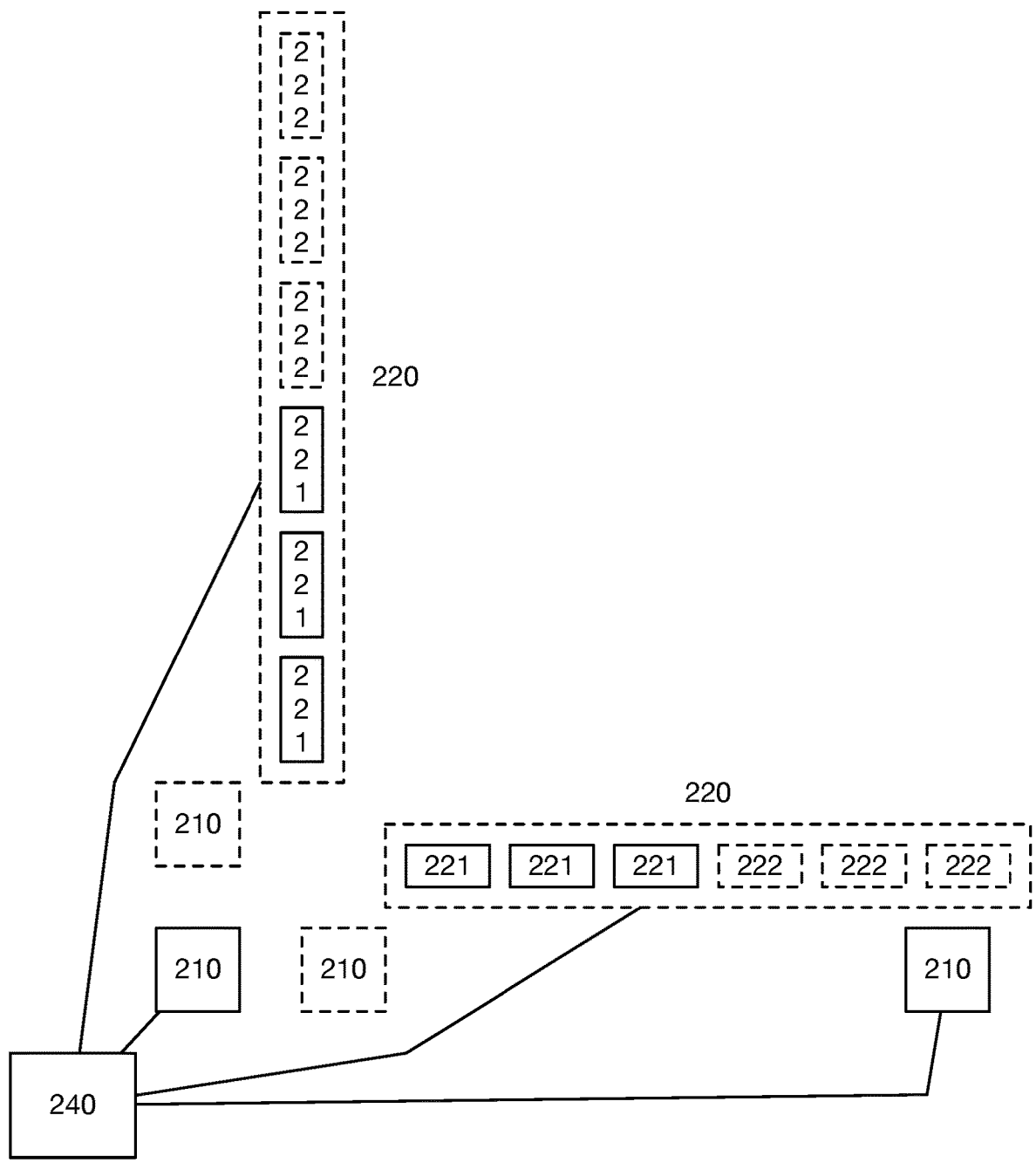

A system 200 for phase-modulated radar detection preferably includes one or more transmitter arrays 210, receiver arrays 220, and signal processors 240 (e.g., as shown in FIGS. 2A-2B). The system 200 can additionally or alternatively include one or more velocity sensing modules 250. In some examples, the system 200 includes one or more elements such as described in U.S. patent application Ser. No. 16/704,409, filed 5, Dec. 2019 and titled "Systems and Methods for Interpolated Virtual Aperture Radar Tracking", and/or in U.S. patent application Ser. No. 17/117,960, filed 10, Dec. 2020 and titled "Systems and Methods for Virtual Doppler and/or Aperture Enhancement", each of which is herein incorporated in its entirety by this reference (e.g., such as described regarding the system 200 of U.S. patent application Ser. No. 16/704,409 and/or of U.S. patent application Ser. No. 17/117,960).

The transmitter array 210 preferably functions to transmit a signal that, after reflection by a target, can provide information about the target (e.g., relative location, velocity, etc.). The transmitter array 210 preferably transmits a frequency shift keyed (FSK) RADAR signal or a frequency-modified continuous wave (FMCW) RADAR signal, but the transmitter array 210 can additionally or alternatively transmit other electromagnetic signals (e.g., radio waves for RADAR; infrared, visible, and/or UV waves for LIDAR; etc.), sound signals (e.g., for SONAR), and/or any other suitable signals.

The transmitter array 210 preferably includes a plurality of transmitter elements (e.g., transmitter antennas). These elements can include: a single transmitter paired to multiple antennas, such as antennas spaced in a particular pattern and/or with antennas coupled to phase shifters and/or time delays; multiple transmitters, each paired to a single antenna; multiple transmitters, some or all paired to multiple antennas (e.g., as described above regarding the single transmitter), with the remaining transmitters preferably each paired to a single antenna; and/or any other suitable transmitter configurations. For example, a transmitter 210 may include transmitter elements spaced by a distances substantially greater (e.g., greater by more than a threshold factor, such as more than 2, 2.5, 3, 4, 5, or 10 times greater) than a distance between receiver elements (e.g., distance between closest receiver elements, average distance between neighboring receiver elements, etc.).

One or more of the transmitter elements (preferably each transmitter element of the system) can include (e.g., be associated with) one or more phase control elements. In some embodiments, the phase control elements include one or more phase inverters (e.g., configured to controllably impose a 180° phase shift on a transmitter signal). The phase control elements can additionally or alternatively include one or more phase shifters (e.g., configured to control a phase shift imposed on the transmitter signal within a phase shifter range, such as ±5°, 10°, 30°, 9°, or 180°, etc.). Although the phase shifter is preferably configured to impose phase shifts substantially independent of frequency, the phase control elements can additionally or alternatively include delay elements (e.g., delay lines) and/or any other suitable elements that impose a frequency-dependent phase shift. Additionally or alternatively, the phase control elements can include elements configured to change one or more aspects of the signal driving the transmitter, such as chirp bandwidth, start frequency (e.g., lowest or highest frequency of a chirp), idle time, and/or any other suitable aspects (e.g., aspects that will result in a phase shift).

The receiver array 220 preferably functions to receive reflections of the probe signal(s) transmitted by the transmitter 210. The receiver array 220 preferably determines phase, magnitude, and/or frequency information from reflected probe signals, but the receiver array 220 can additionally or alternatively determine any available characteristics of the reflected probe signals.

The receiver array 220 preferably includes a plurality of receiver elements (e.g., receiver antennas). The receiver array 220 includes a set of receiver elements 221 arranged in a pattern (e.g., along a horizontal or vertical axis, within a plane, etc.). The set of receiver elements 221 can include a single receiver paired to multiple antennas, such as antennas spaced in a particular pattern and/or with antennas coupled to phase shifters and/or time delays; multiple receivers, each paired to a single antenna; multiple receivers, some or all paired to multiple antennas (e.g., as described above regarding the single receiver), with the remaining receivers preferably each paired to a single antenna; and/or any other suitable receiver configurations.

Figure 5A:
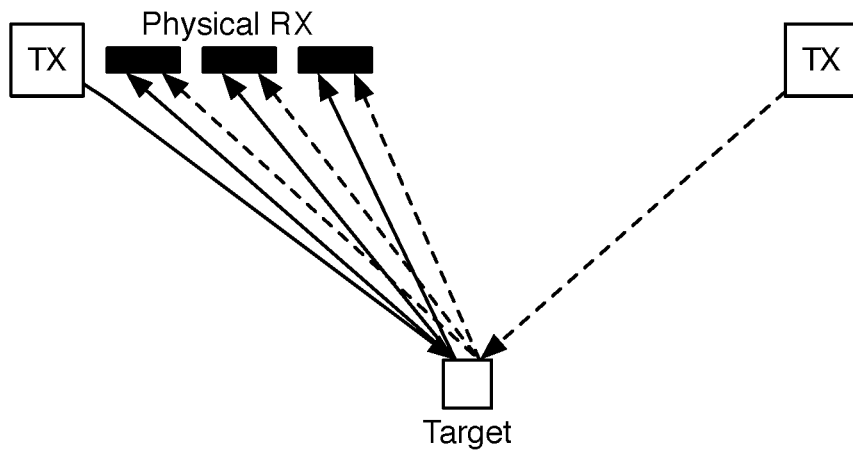
FIGS. 5A-5C are schematic representations of a first example of phase-modulated radar tracking, depicting a physical aperture, a pre-interpolation virtual aperture, and a post-interpolation virtual aperture, respectively.
Figure 5B:
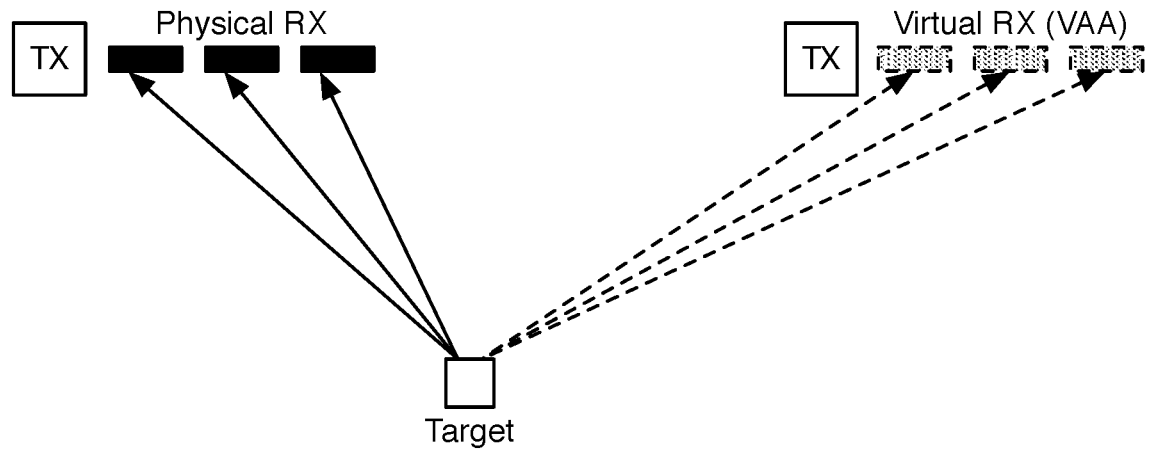
Figure 5C:
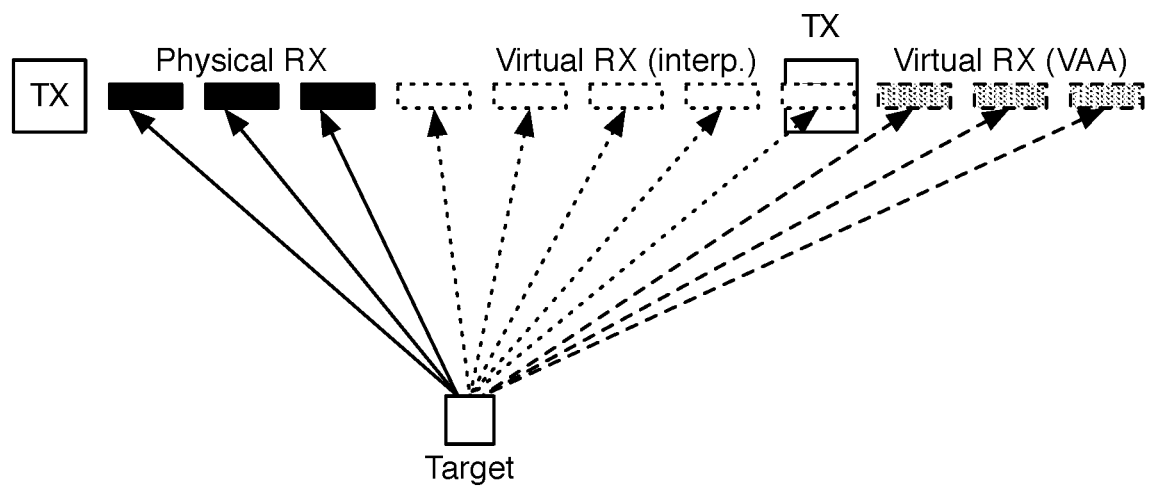
Figure 6A:
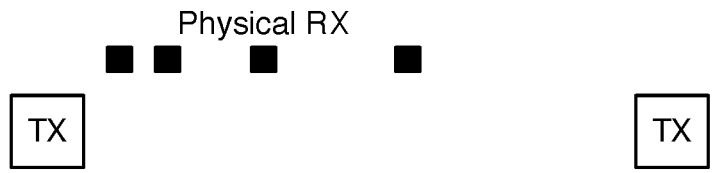
FIGS. 6A-6C are schematic representations of a second example of phase-modulated radar tracking, depicting a physical aperture, a pre-interpolation virtual aperture, and a post-interpolation virtual aperture, respectively.
Figure 6B:
Figure 6C:
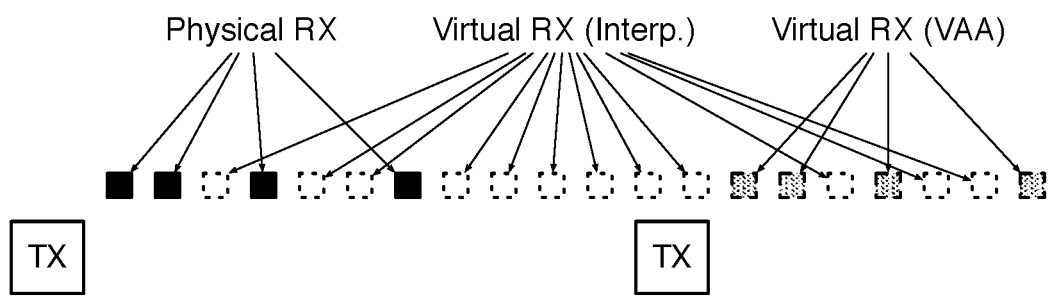
Figure 7A:
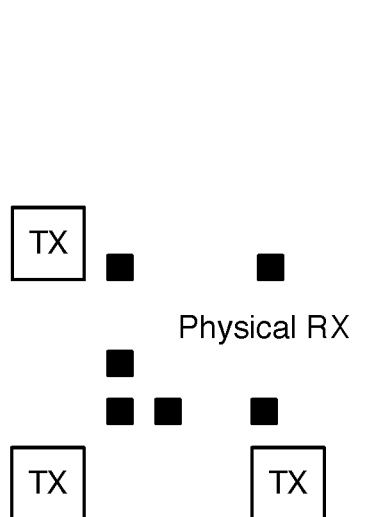
FIGS. 7A-7C are schematic representations of a third example of phase-modulated radar tracking, depicting a physical aperture, a pre-interpolation virtual aperture, and a post-interpolation virtual aperture, respectively.
Figure 7B:
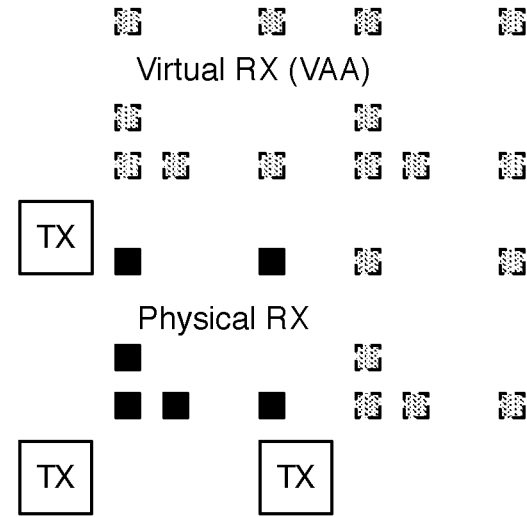
Figure 7C:
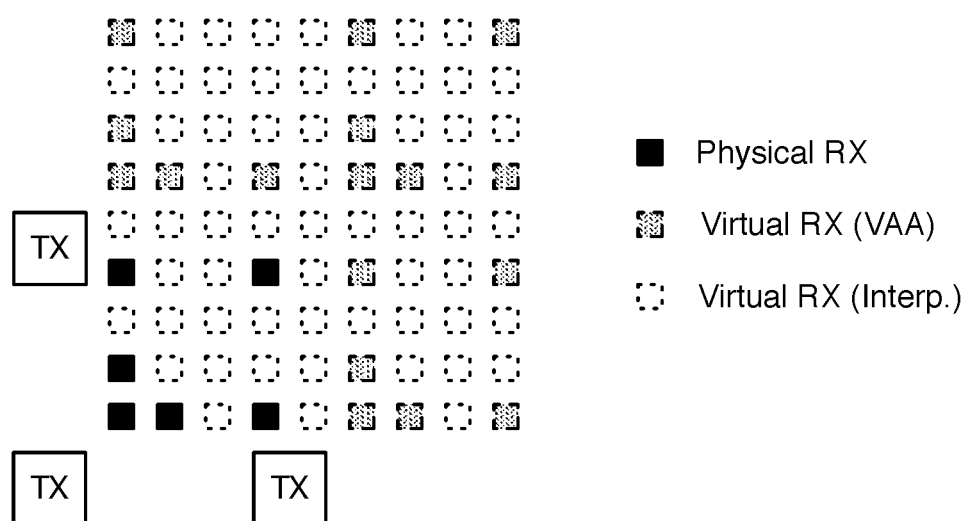
Figure 8A:
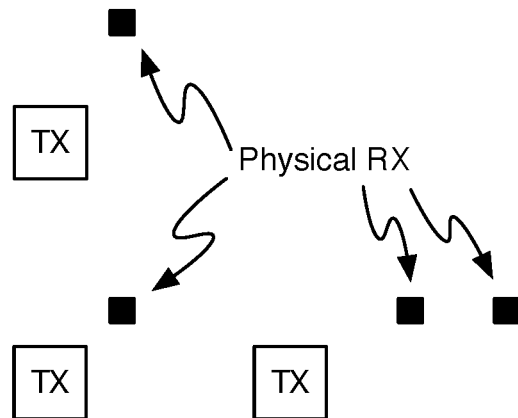
FIGS. 8A-8C are schematic representations of a fourth example of virtual aperture radar detection, depicting a physical aperture, a pre-interpolation virtual aperture, and a post-interpolation virtual aperture, respectively.
Figure 8B:
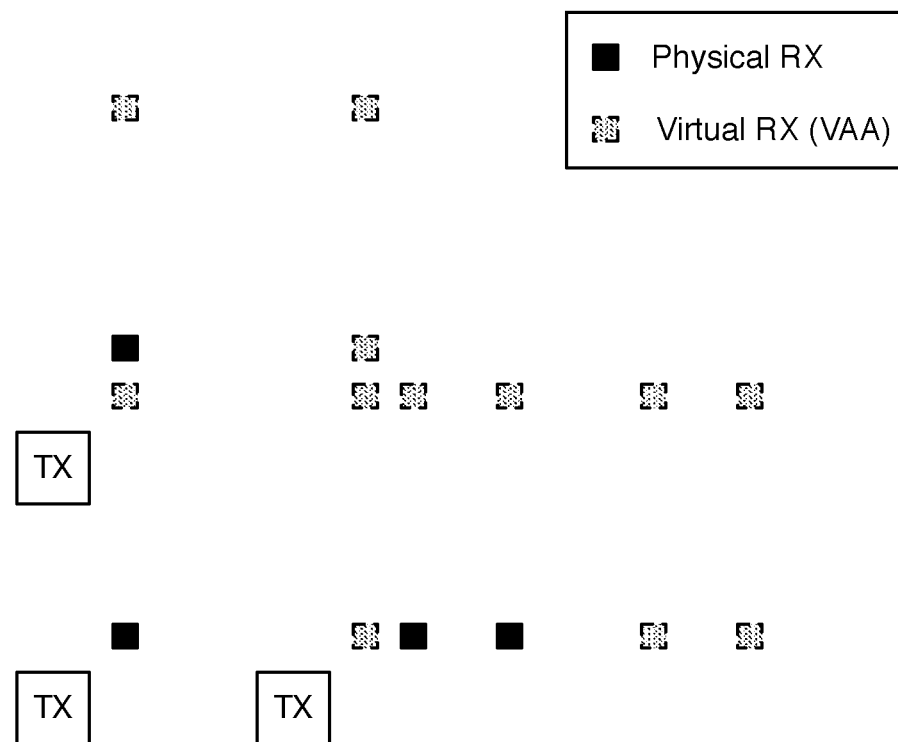
Figure 8C:
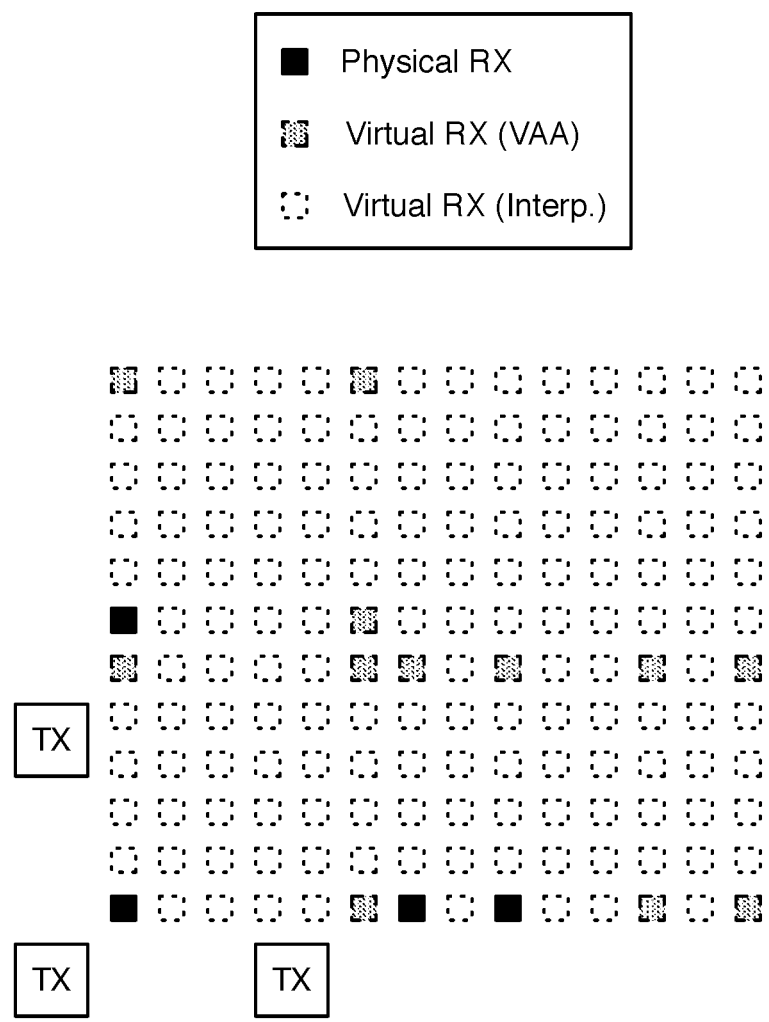
Figure 9A:
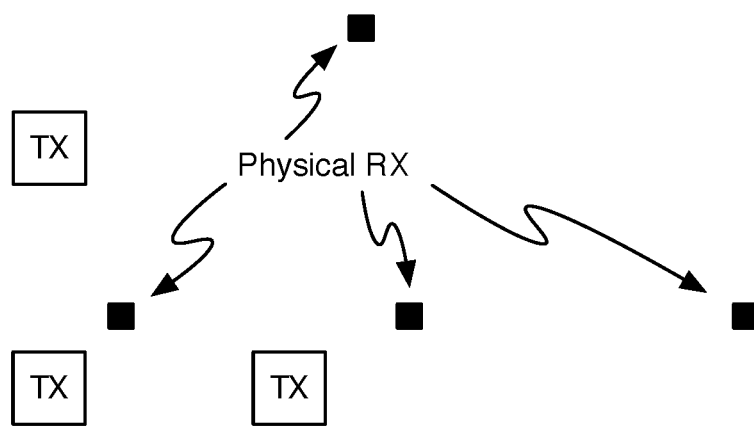
FIGS. 9A-9C are schematic representations of a fifth example of virtual aperture radar detection, depicting a physical aperture, a pre-interpolation virtual aperture, and a post-interpolation virtual aperture, respectively.
Figure 9B:
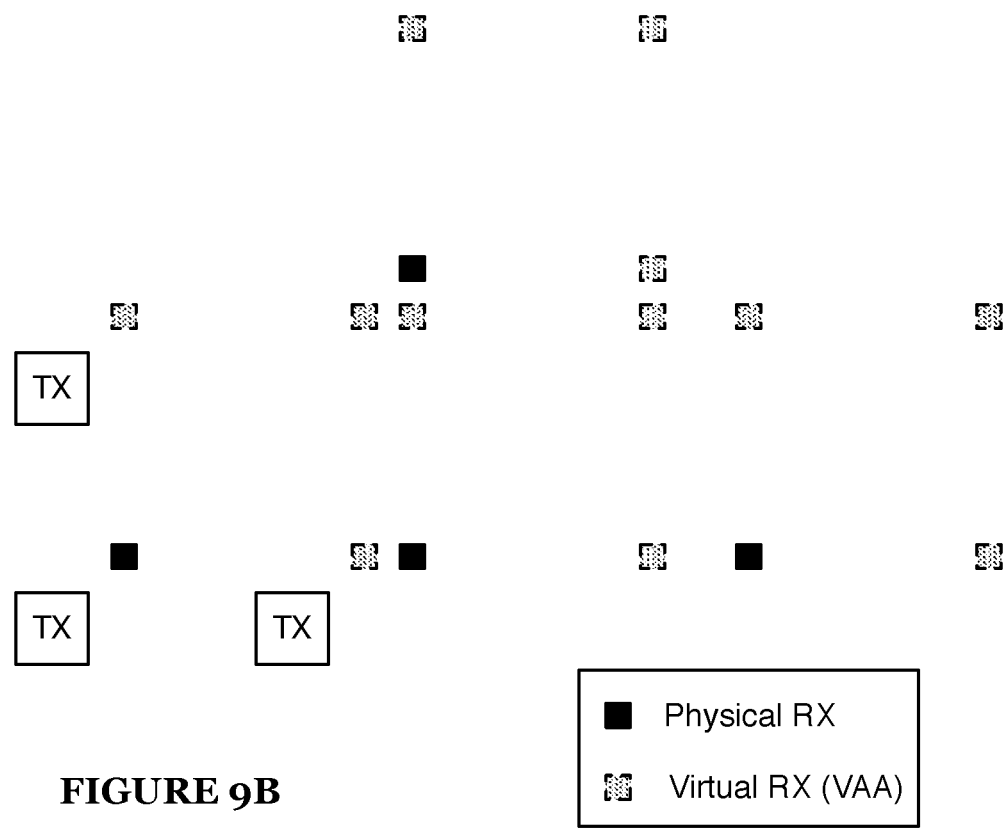
Figure 9C:
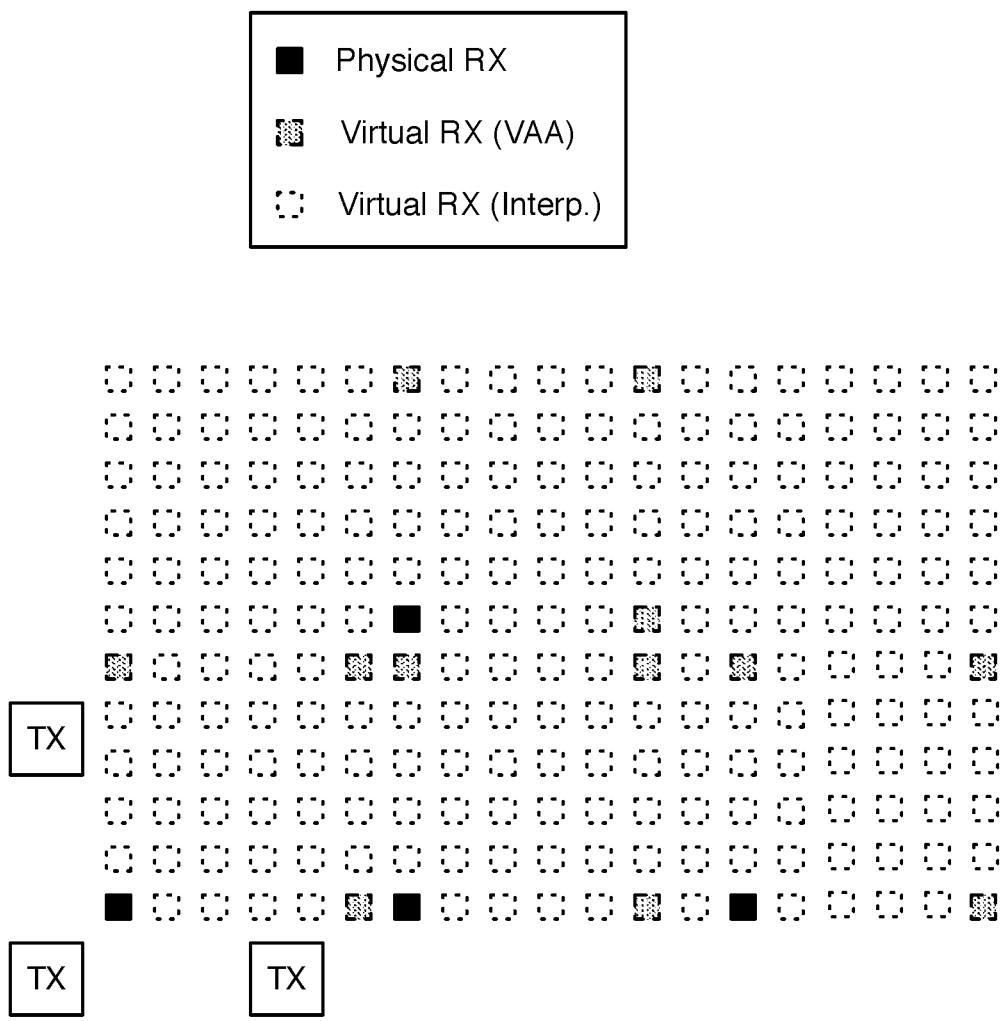
Figure 10A:
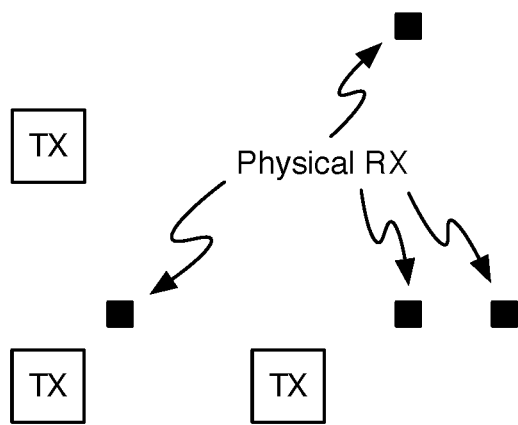
FIGS. 10A-10C are schematic representations of a sixth example of virtual aperture radar detection, depicting a physical aperture, a pre-interpolation virtual aperture, and a post-interpolation virtual aperture, respectively.
Figure 10B:
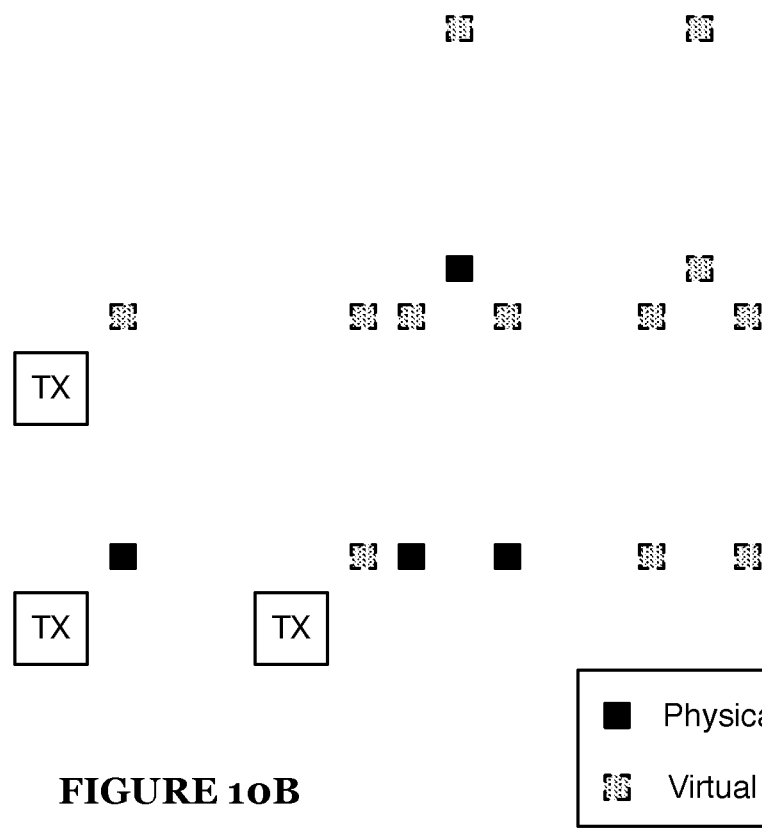
Figure 10C:
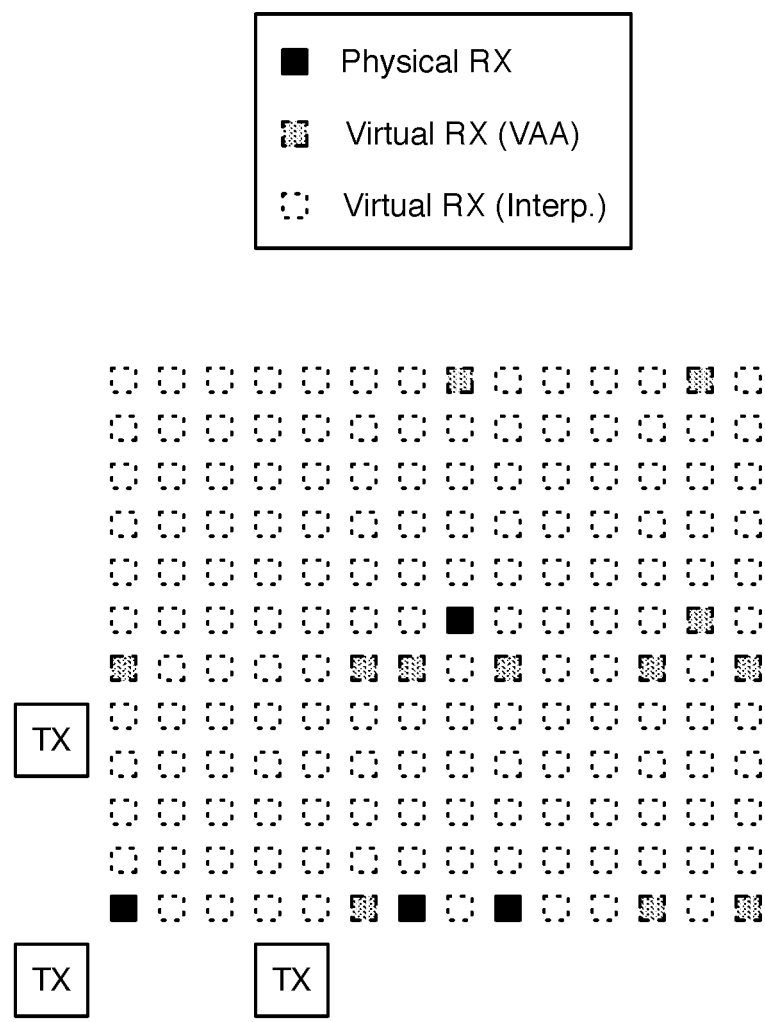
Figure 11B:
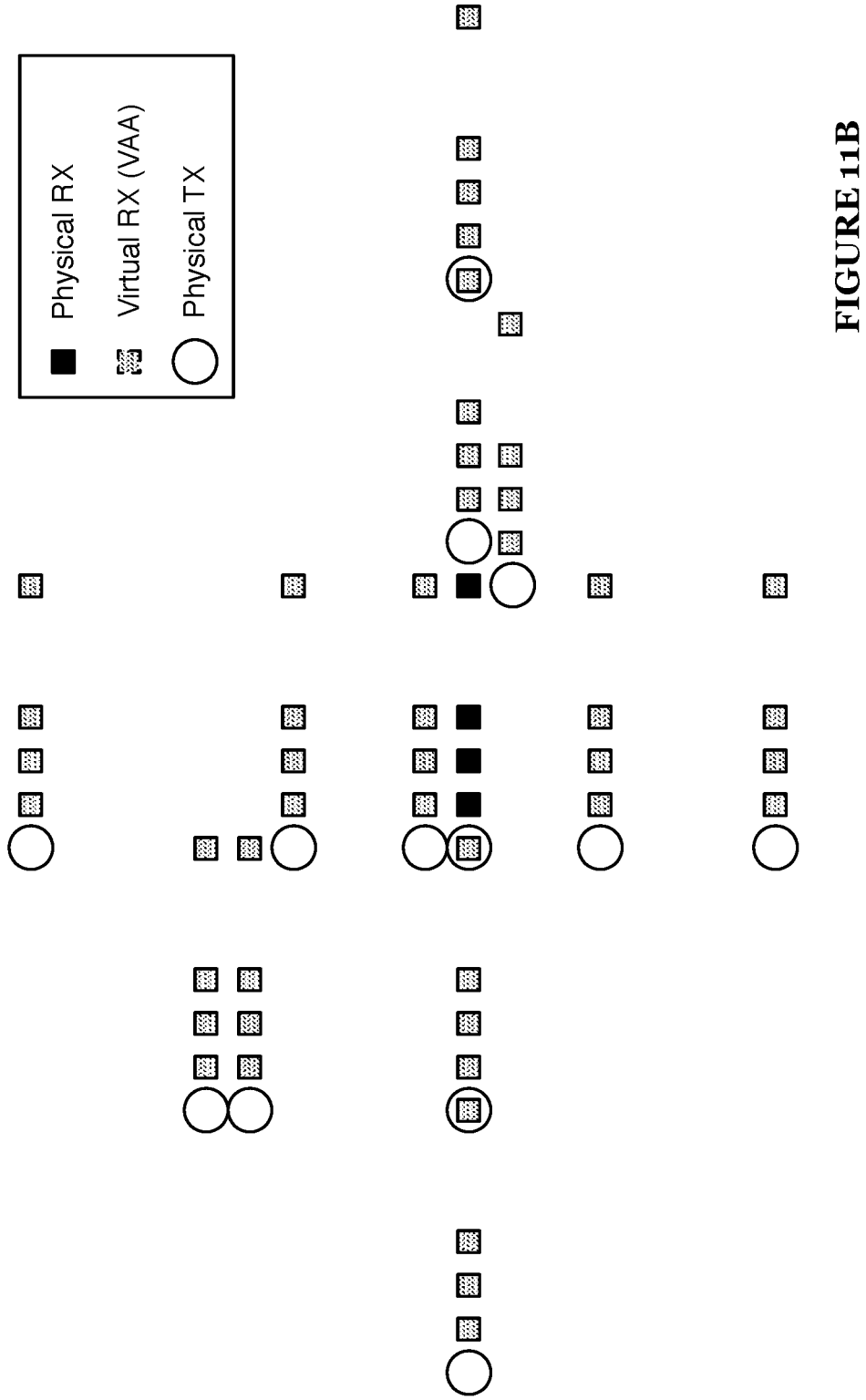

For each array (e.g., each transmitter array 210 and/or each receiver array 220), some or all element pairs (e.g., pairs of transmitter antennas for the transmitter array, pairs of receiver antennas for the receiver array) preferably have a spacing substantially equal to (and/or less than) $\lambda/2$ (wherein $\lambda$ is the radio wavelength transmitted by the transmitters). This $\lambda/2$ spacing can be a spacing between physical elements (e.g., as shown in FIGS. 5A, 6A, and/or 7A), between a physical element and a virtual (e.g., MIMO) element (e.g., as shown in FIGS. 8B, 9B, and/or 10B; wherein analysis techniques such as described below regarding S130 can be used to achieve alignment between such elements), between virtual elements, and/or between any other suitable elements. In examples in which the array is multidimensional (e.g., planar, including both horizontal and vertical elements, etc.), the array preferably includes, for each dimension of the array (e.g., for a planar array, horizontal and vertical), one or more element pairs with a $\lambda/2$ spacing along that dimension; such pairs are more preferably substantially aligned along the other dimension(s) (e.g., as shown in FIGS. 7A, 8B, and/or 9B), but can additionally or alternatively include pairs with a $\lambda/2$ spacing along multiple dimensions (e.g., as shown in FIGS. 10B, 11A, and 11B) and/or with any other suitable spacing along the other dimension(s). In some examples, the array defines one or more primary axes (e.g., two orthogonal axes, such as a horizontal or azimuthal axis and a vertical or elevation axis). The primary axes can include axes along which several array elements are aligned and/or any other suitable axes. In some such examples, some element pairs can have a $\lambda/2$ spacing component along one or more of the primary axes (but have a total spacing greater than $\lambda/2$). For example, a pair of elements (e.g., transmit elements) can be arranged along a line at substantially a 45° angle to each of two orthogonal primary axes, and can have a $\lambda/2$ spacing component along each primary axis (giving a total spacing of $\lambda\sqrt{2}$ between the elements), such as shown by way of examples in FIGS. 10B, 11A, and 11B. However, the arrays can additionally or alternatively include elements with any other suitable spacing. The elements of some or all of the arrays can be arranged in linear (or substantially linear) arrangements, arranged in planar (or substantially planar) arrangements, arranged substantially along a surface (e.g., cylindrical surface, spherical surface, conical surface, etc.), arranged throughout a volume, and/or have any other suitable arrangement. The transmitter and receiver arrays (and/or aspects thereof, such as primary axes, etc.) can be arranged linearly, orthogonally, parallel, at oblique angles, skew, co-planar, and/or have any suitable arrangement relative to each other. Some example arrangements are shown in FIGS. 2C, 2D, 5A, 6A, 7A, 8A, 9A, and 10A.

The signal processor 240 preferably functions to analyze information received from other elements of the system 200, such as information determined, sampled, and/or otherwise collected by the transmitter array 210, receiver array 220, vertical receiver array 230, and/or velocity sensing module 250. The signal processor can additionally or alternatively function to control configuration and/or operation of one or more elements of the system 200. In examples, the signal processor 240 can: control transmission and/or receipt of probe signals (e.g., as described below regarding S110 and/or S120), decode and/or store received probe signals (e.g., as described below regarding S130), evaluate effects of phase variance (e.g., as described below regarding S140), modify probe signal characteristics (e.g., as described below regarding S150), calculate tracking parameters (e.g., as described in U.S. patent application Ser. No. 16/704,409, filed 5, Dec. 2019 and titled "Systems and Methods for Interpolated Virtual Aperture Radar Tracking", and/or in U.S. patent application Ser. No. 17/117,960, filed 10, Dec. 2020 and titled "Systems and Methods for Virtual Doppler and/or Aperture Enhancement", each of which is herein incorporated in its entirety by this reference, such as described in U.S. patent application Ser. No. 16/704,409 regarding calculating initial tracking parameters S130, refining the initial tracking parameters S140, and/or modifying probe signal characteristics S150, and/or such as described in U.S. patent application Ser. No. 17/117,960 regarding analyzing received probe signals S130; etc.), and/or perform any other suitable functions (e.g., any other computing and/or processing functions).

The signal processor 240 preferably includes a one or more processors (e.g., CPU, GPU, microprocessor, microcontroller, FPGA, ASIC, etc.) and/or storage units (e.g., Flash, RAM, magnetic disk drive, etc.), but can additionally or alternatively include any other suitable elements. However, the signal processor 240 can additionally or alternatively perform its functions in any other suitable manner. The signal processor 240 can additionally or alternatively be used to communicate with an external computer (e.g., to offload computations, receive additional data, and/or for any other suitable reason). However, the system 200 can additionally or alternatively include any other suitable signal processor(s) 240.

The velocity sensing module 250 preferably functions to determine (e.g., measure, estimate, receive information indicative of, etc.) the velocity (egovelocity) of the system 200 (and/or of one or more elements of the system 200, such as the transmitter and/or receiver arrays; and/or one or more objects coupled to the system 200; etc.). In some embodiments, the velocity sensing module includes and/or receives information indicative of velocity from one or more sensors (e.g., wherein the velocity sensing module includes one or more communications interfaces that receive information from the sensor(s)). The sensors can include spatial sensors (e.g., inertial measurement sensors, accelerometer, gyroscope, altimeter, magnetometer, etc.), location sensors (e.g., GNSS and/or other geopositioning modules, such as receivers for one or more of GPS, GLONASS, BeiDou, Galileo, etc.; local positioning modules, such as modules enabling techniques such as triangulation, trilateration, multilateration, etc.), speed sensors (e.g., pitot probes, wheel speed sensors, etc.), and/or any other suitable sensors. The communications interfaces can include Wi-Fi, Bluetooth, Ethernet, ODB-II, CAN bus, and/or any other suitable wired and/or wireless communication interfaces.

Some or all elements of the system 200 can include one or more aspects (e.g., sub-elements, configurations, functionalities, arrangements, etc.) such as described in U.S. patent application Ser. No. 16/704,409, filed 5, Dec. 2019 and titled "Systems and Methods for Interpolated Virtual Aperture Radar Tracking", and/or in U.S. patent application Ser. No. 17/117,960, filed 10, Dec. 2020 and titled "Systems and Methods for Virtual Doppler and/or Aperture Enhancement", each of which is herein incorporated in its entirety by this reference. However, the system 200 can additionally or alternatively include any other suitable elements in any suitable arrangement.

2. Method.

Figure 1:
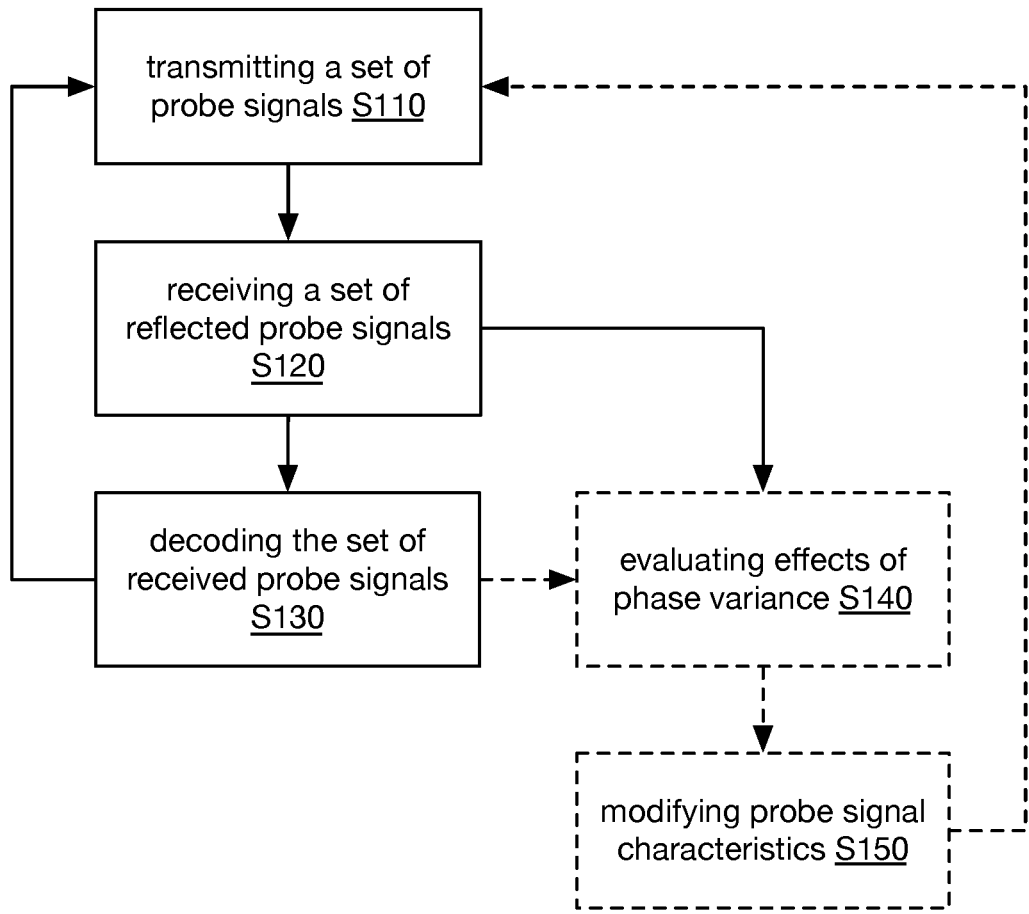
FIG. 1 is a schematic representation of an embodiment of the method.

A method 100 for phase-modulated radar detection preferably includes: transmitting a set of probe signals S110, receiving a set of reflected probe signals S120, and/or decoding the set of received probe signals S130 (e.g., as shown in FIG. 1). The method can optionally include evaluating effects of phase variance S140, modifying probe signal characteristics S150, and/or any other suitable elements. The method preferably functions to enable radar-based detection of targets within an environment surrounding a system implementing the method. The method 100 is preferably implemented using a radar system (e.g., the system 200 described above), but can additionally or alternatively be implemented using any other suitable wave-based detection system (e.g., sonar system, lidar system, etc.).

2.1 Transmitting a Set of Probe Signals.

Transmitting a set of probe signals S110 preferably functions to transmit signals that, after reflection off of one or more targets, can provide information about those targets (e.g., relative location and/or velocity, etc.). S110 preferably includes transmitting frequency shift keyed (FSK) RADAR signals and/or frequency-modified continuous wave (FMCW) RADAR signals (e.g., defining a plurality of "chirps"). However, S110 can additionally or alternatively include transmitting any other suitable signals. In examples, the signals can include electromagnetic signals (e.g., radio waves in RADAR; infrared, visible, and/or UV light in LIDAR; etc.) and/or sound signals (e.g., as in SONAR). In some embodiments, one or more elements of S110 are performed such as described in U.S. patent application Ser. No. 16/704,409, filed 5, Dec. 2019 and titled "Systems and Methods for Interpolated Virtual Aperture Radar Tracking", and/or in U.S. patent application Ser. No. 17/117,960, filed 10, Dec. 2020 and titled "Systems and Methods for Virtual Doppler and/or Aperture Enhancement", each of which is herein incorporated in its entirety by this reference (e.g., as described in U.S. patent application Ser. No. 16/704,409 and/or in U.S. patent application Ser. No. 17/117,960 regarding transmitting a set of probe signals S110).

In embodiments in which a plurality of chirps are transmitted, each chirp is preferably considered a separate probe signal. However, a probe signal can alternatively include multiple such chirps (e.g., 2, 4, 8, 16, 32, 2-16, 16-64, or more than 64 chirps, etc.), can include only portions of a chirp, and/or can include any other suitable transmitted signal.

The transmitted probe signals are preferably grouped into signal groups. Signals of a signal group are preferably transmitted consecutively (e.g., with substantially no time between signal transmission, with some delay time between signals, etc.). Alternatively, signals of a signal group can be transmitted concurrently, preferably only if the signals are distinguishable, such as distinguishable based on radio frequency (e.g., wherein each signal of the group covers a different, preferably non-overlapping, frequency band). However, the signals can additionally or alternatively be transmitted with any other suitable timing.

Within each signal group, the signals of the group are preferably linearly independent (more preferably substantially orthogonal). Each signal is preferably generated using multiple transmitters (more preferably using all transmitters of the system) transmitting concurrently. However, some or all signals of a group can alternatively be generated by transmission from a single transmitter and/or generated in any other suitable manner.

The signal groups can be substantially identical to each other (before imposition of additional phase variance such as described below). For example, each signal group can include the same sequence of N orthogonal signals, wherein N is preferably equal to the number of transmitters in the system (and/or the number of transmitters used to generate the signals of the signal group). In alternative examples, signal groups can include the same signals but in different orders from each other, can include one or more signals different from signals of the other signal groups, and/or can include any other suitable signals.

In some embodiments, the signals of a signal group are encoded by phase modulation. For example, each transmitter can concurrently transmit a substantially identical signal, but with some of these signals being phase-shifted relative to others. For example, the signals can be encoded using a binary phase modulation (e.g., imposed using a phase inverter on some or all of the transmitters, wherein some signals of the group are transmitted substantially 180° out of phase with other signals of the group), quaternary phase modulation, any other suitable phase shift keying, and/or any other suitable modulation scheme.

However, the signals can additionally or alternatively have any other suitable relationship, preferably wherein different transmitted probe signals are distinguishable from each other (e.g., based on timing, phase effects, other modulation, etc.).

S110 preferably includes imposing additional phase variance (e.g., in addition to the phase modulation encoding described above) on some or all of the transmitted probe signals. This phase variance preferably includes imposing small phase shifts (e.g., shifts between the different transmitters, shifts relative to a phase reference, etc.), such as phase shifts having a magnitude less than (or no greater than) a threshold magnitude (e.g., 1, 2, 5, 10, 15, 30, 60, 90, 0-2, 2-5, 5-10, 10-20, 20-35, 35-50, 50-70, or 70-90 degrees, etc.; preferably wherein the threshold magnitude is 2-15°. The imposed phase variance preferably changes over time (e.g., changing between each chirp, changing between sets of multiple chirps, changing during a chirp such as changing more than once for each chirp, etc.). The phase variance can be imposed uniformly on all the transmitters (or multi-transmitter configurations), can differ between transmitters (or multi-transmitter configurations), or can be imposed in any other suitable manner.

In a first example, the phase shifts correspond (or substantially correspond) to beam steering configurations (e.g., for the phased transmitter array). In this example, the phase variance is controlled within a one- or two-dimensional space (e.g., wherein the one or two free variables of the space are associated with the beam steering heading, such as corresponding to an azimuthal angle and/or an elevation angle). In a second example, arbitrary phase shifts can be imposed, such as wherein, for a system with N transmitters, the phase variance is selected within an N−1 dimensional space (e.g., corresponding to N−1 free variables, associated with each phase shift except for that of one transmitter, which is taken as a zero phase shift reference). In a third embodiment, the phase shifts can include variances selected over any other suitable space (e.g., having dimension greater than two but less than N−1) and/or can include any other suitable phase shifts.

The phase shifts can arise from (e.g., be imposed by) phase shifters, time delay elements (e.g., delay lines), changes to transmitted signal chirp characteristics (e.g., chirp bandwidth, start frequency, idle time, etc.), and/or can arise due to any other suitable effects.

The sequence of phase shifts can be a predetermined sequence, dynamically determined sequence, randomly or pseudo-randomly determined sequence, and/or any other suitable sequence. In some examples, the predetermined sequences can include Gold codes, Kasami codes, Hadamard codes, Zadoff-Chu sequences, complementary sequences, other code sequences with low cross-correlation, and/or any other suitable sequences. However, the phase shifts can additionally or alternatively be selected in any other suitable manner.

The phase shifts imposing the additional phase variance can be changed with each chirp, each signal group, and/or for any other suitable set of signals. The phase shifts are preferably changed with regular timing, but can alternatively be changed sporadically, in response to triggers, and/or with any other suitable timing.

Aside from the phase modulation encoding, all other transmission characteristics (e.g., chirp characteristics), such as duration, idle time, slope, bandwidth, phase variance, etc., are preferably identical (or substantially identical) between concurrent transmissions from the different transmit elements (e.g., between concurrently-transmitted probe signals). In examples in which phase variance (e.g., as described above) is imposed on concurrently-transmitted chirps, uniform phase variance is preferably superimposed on the phase modulation of each chirp, which can function to maintain orthogonality between the chirps; for example, a 5° phase shift can be imposed uniformly on all chirps, in addition to binary phase modulation used to achieve orthogonality. However, some or all chirp characteristics can alternatively vary between the different concurrent (and/or otherwise temporally-overlapping) chirps; for example, differing phase variances can be applied to different chirps (e.g., as described above in more detail).

Figure 12A:
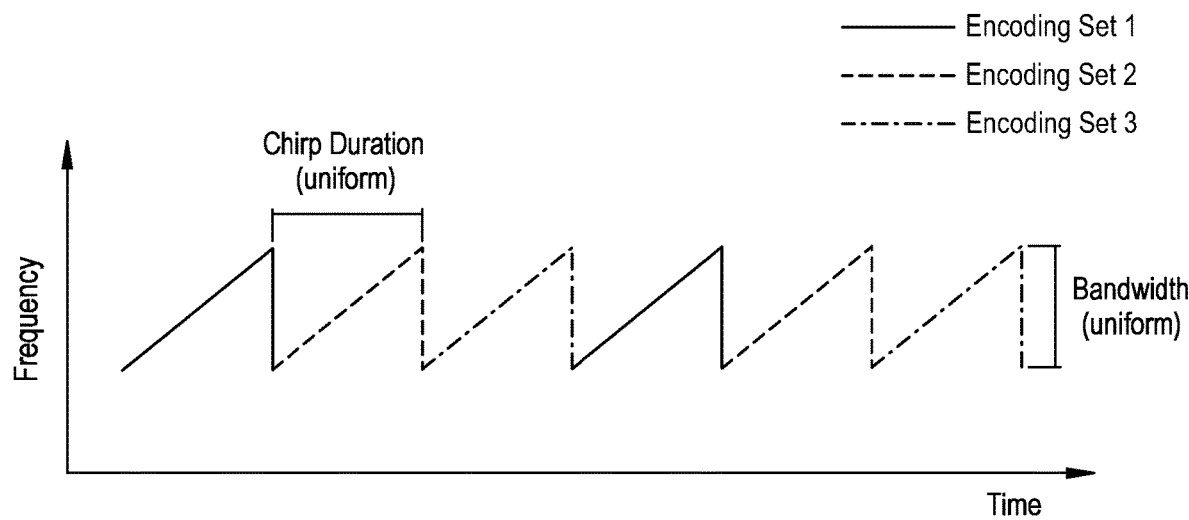
FIGS. 12A-12B are schematic representations of a first and second example, respectively, of chirp profiles.
Figure 12B:
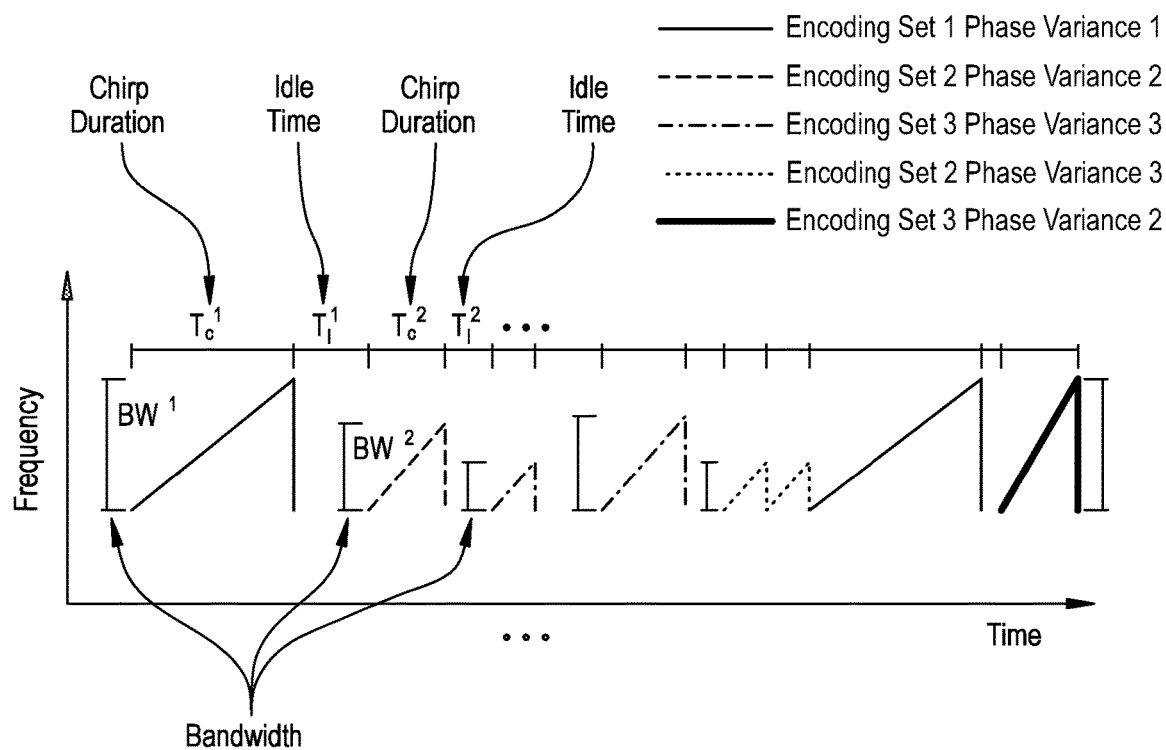

An example of chirps (e.g., multiplexed chirps, such as concurrently-transmitted phase-encoded chirps, preferably having substantially orthogonal encodings) exhibiting substantially no idle times, and with substantially fixed bandwidths, slopes, and phase is shown in FIG. 12A. In contrast, an example of chirps (e.g., multiplexed chirps, such as concurrently-transmitted phase-encoded chirps, preferably having substantially orthogonal encodings) exhibiting varying idle times, bandwidths, slopes, and additional phase variances is shown in FIG. 12B, where different phase shifts are depicted using different line styles. However, the idle times, bandwidths, slopes, and/or phase shifts of the chirps can additionally or alternatively be controlled (e.g., varied) in any other suitable manner.

S110 preferably includes transmitting one or more frames of signals, wherein each frame is a collection of (preferably, consecutively-transmitted) probe signals. For example, each frame can include a specific number of probe signals (e.g., chirps) or signal groups, such as 8, 16, 32, 64, 128, 256, 512, 1024, 2048, 4096, 2-32, 32-128, 64-1024, 64-256, 128-512, 256-1024, 1024-4096, or more than 4096. The frame size (e.g., number of probe signals in a frame) can be predetermined, dynamically determined (e.g., as described below regarding S150, and/or determined in any other suitable manner.

However, S110 can additionally or alternatively include transmitting any other suitable set of probe signals in any suitable manner.

2.2 Receiving a Set of Reflected Probe Signals.

Receiving a set of reflected probe signals S120 preferably functions to determine information associated with reflections (e.g., from targets in the environment) of the probe signals transmitted in S110. S120 preferably includes determining (e.g., measuring) phase, magnitude, and/or frequency information from reflected probe signals, but S120 may additionally or alternatively include measuring any available characteristics of the reflected probe signals. S120 preferably includes determining any data necessary to recover signal identification information (e.g., information for determining which signal, such as which signal of a signal group or of the transmitted set, the reflected probe signal corresponds to). S120 can optionally include phase shifting some or all of the received signals (e.g., using phase shift elements associated with the receivers), and/or processing the received signals in any other suitable manner.

S120 preferably includes storing some or all of the received signals. The received signals can be stored at each receiver (e.g., storing signals received by that receiver), stored at a centralized storage element (e.g., associated with a computing element such as the signal processor 240), and/or stored in any other suitable location(s). The stored signals preferably include all signals of a signal group or of a frame (and can optionally include signals of multiple signal groups or frames). However, S120 can additionally or alternatively include storing any other suitable received signals in any suitable manner.

However, S120 can additionally or alternatively include receiving the set of reflected probe signals in any other suitable manner.

2.3 Decoding the Set of Received Probe Signals.

Decoding the set of received probe signals S130 preferably functions to convert the received signals into signals that can be used to determine information (e.g., relative position and/or velocity) about the targets off of which the signals were reflected.

S130 preferably includes processing the received signals (e.g., signals received and/or stored in S120) to extract additional information, such as to extract transmitter-specific signals. For any of the receivers, a transmitter-specific signal associated with a particular transmitter is the signal that would have been received at that receiver if the particular transmitter had transmitted by itself (no other transmitters of the system concurrently transmitting); as such, each transmitter-receiver pair of the system (e.g., for a system with 3 transmitter elements and 4 receiver elements, each of the 12 different possible pairings of one transmitter element with one receiver element) is associated with a transmitter-specific signal.

For each transmitter, the transmitter-specific signal (at a particular receiver) is preferably substantially equal to a linear combination of signals received at the particular receiver. The appropriate linear combination is different for each transmitter, and is determined by the encoding of the signals in the signal group. The appropriate linear combination for a particular transmitter is the same for each receiver (wherein the transmitter-specific signal for a particular receiver can be determined using the signals received by that receiver). S130 preferably includes determining this transmitter-specific signal for each transmitter-receiver pair (e.g., for a system including three transmitters and four receivers, calculating a total of 12 transmitter-specific signals). These transmitter-specific signals correspond to a larger set of receivers (e.g., including both the physical receivers 221 and extrapolated virtual receivers 222, such as in MIMO radar systems), wherein the total number of (physical and/or virtual) receivers is preferably equal to the product of the number of transmitters and physical receivers (e.g., as shown in FIGS. 5B, 6B, 7B, 8B, 9B, and/or 10B). The method can additionally or alternatively include determining one or more interpolated signals. These interpolated signals preferably correspond to interpolated virtual receivers, such as virtual receivers with $\lambda/2$ spacing relative to neighboring (real, extrapolated, and/or interpolated) receivers and/or any other suitable spacing. In some specific examples, the interpolated signals are used to "fill out" a sparse array of physical and/or extrapolated virtual receivers (e.g., as shown in FIGS. 5C, 6C, 7C, 8C, 9C, and/or 10C). The (extrapolated and/or interpolated) virtual receivers can define an array multiplication factor (e.g., equal to the total number of real and virtual receivers divided by the number of real receivers, or divided by the product of the number of real receivers and real transmitters, etc.). This extrapolation and/or interpolation (and/or elements thereof) can be performed such as described in U.S. patent application Ser. No. 16/704,409, filed 5, Dec. 2019 and titled "Systems and Methods for Interpolated Virtual Aperture Radar Tracking", which is herein incorporated in its entirety by this reference (e.g., as described in U.S. patent application Ser. No. 16/704,409 with respect to VAA and/or IVAA, such as wherein interpolated signals are determined as described in U.S. patent application Ser. No. 16/704,409 with respect to generating interpolated signal instances S132).

Decoding the received probe signals (e.g., processing to extract the transmitter-specific signals) can include accounting for the entire signal change (e.g., associated with both the primary phase encoding, such as binary phase modulation, and the additional phase variance), can account only for some of the signal changes (e.g., only the primary phase encoding, the primary phase encoding plus a portion of the additional phase variance, etc.), and/or can account for any other suitable phase modulation and/or other encoding aspects. In one example, in which the decoding process accounts only for the primary phase encoding (e.g., binary phase modulation) and not for the additional phase variance, the appropriate linear combinations can be determined based on the phase modulation matrix (e.g., wherein the inverse of the modulation matrix is a decoding matrix that represents the appropriate linear combination for each transmitter).

Figure 3A:
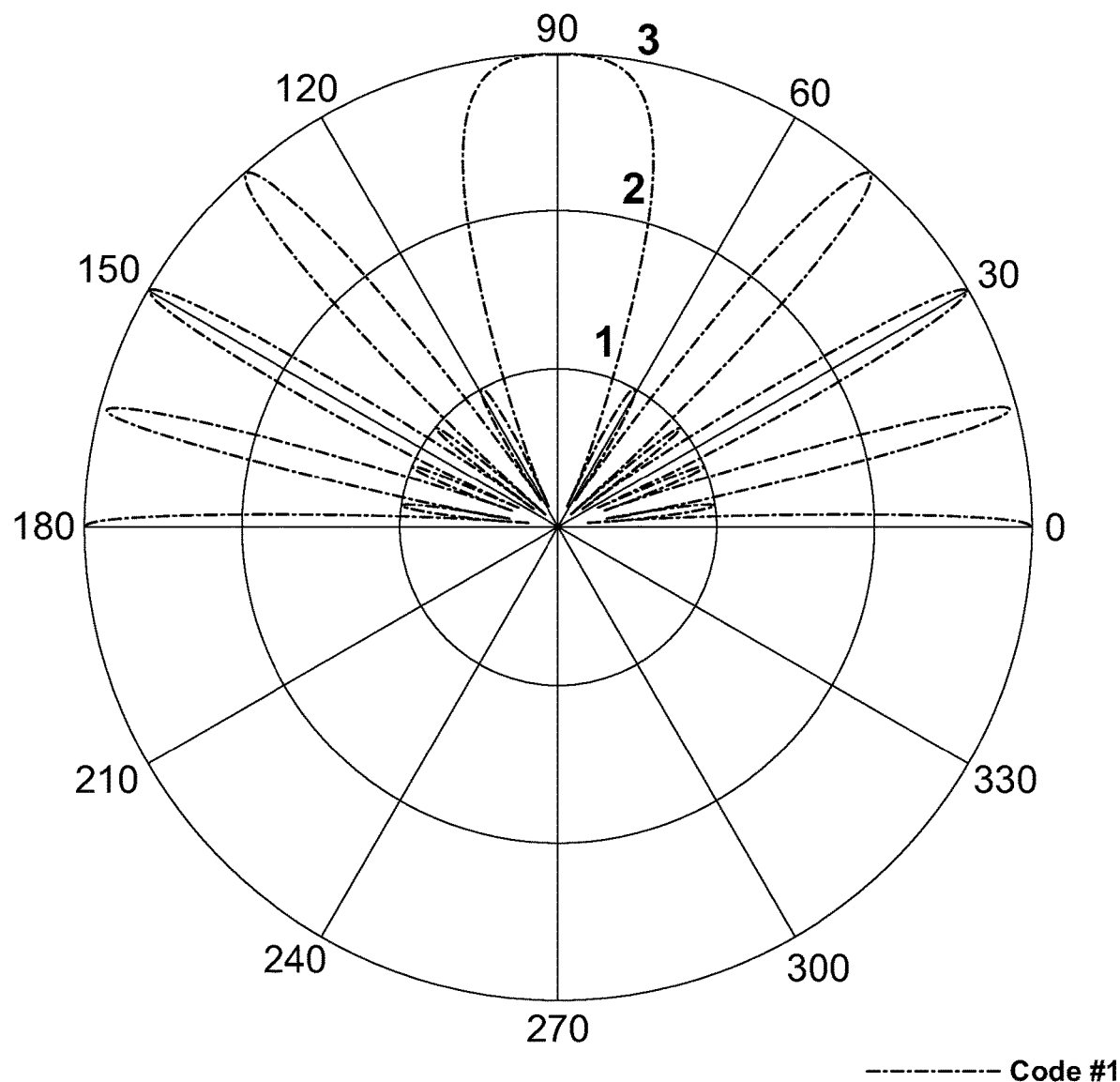
FIGS. 3A-3C are intensity plots of various radiation patterns of an embodiment of the method.
Figure 3B:
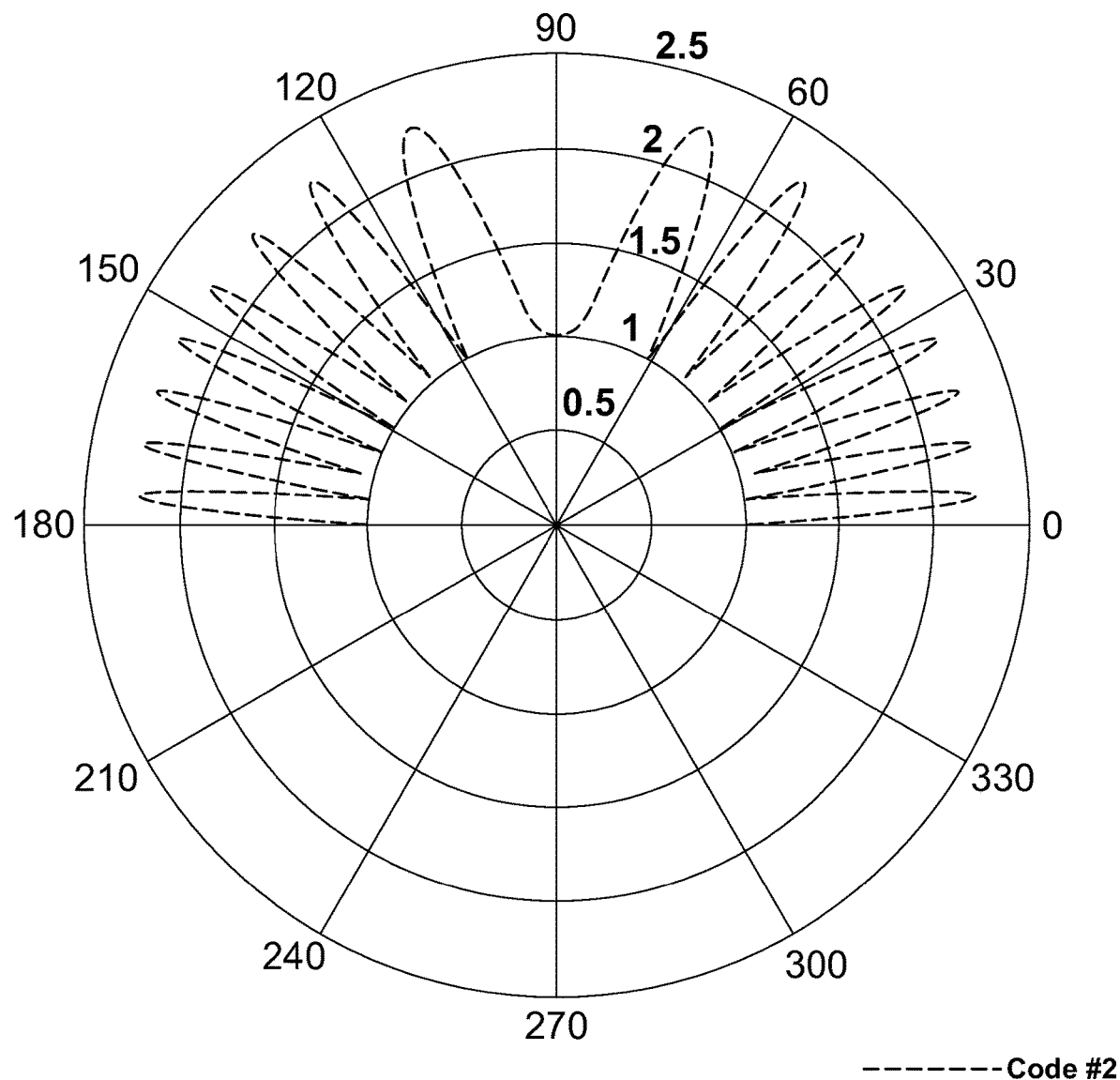
Figure 3C:
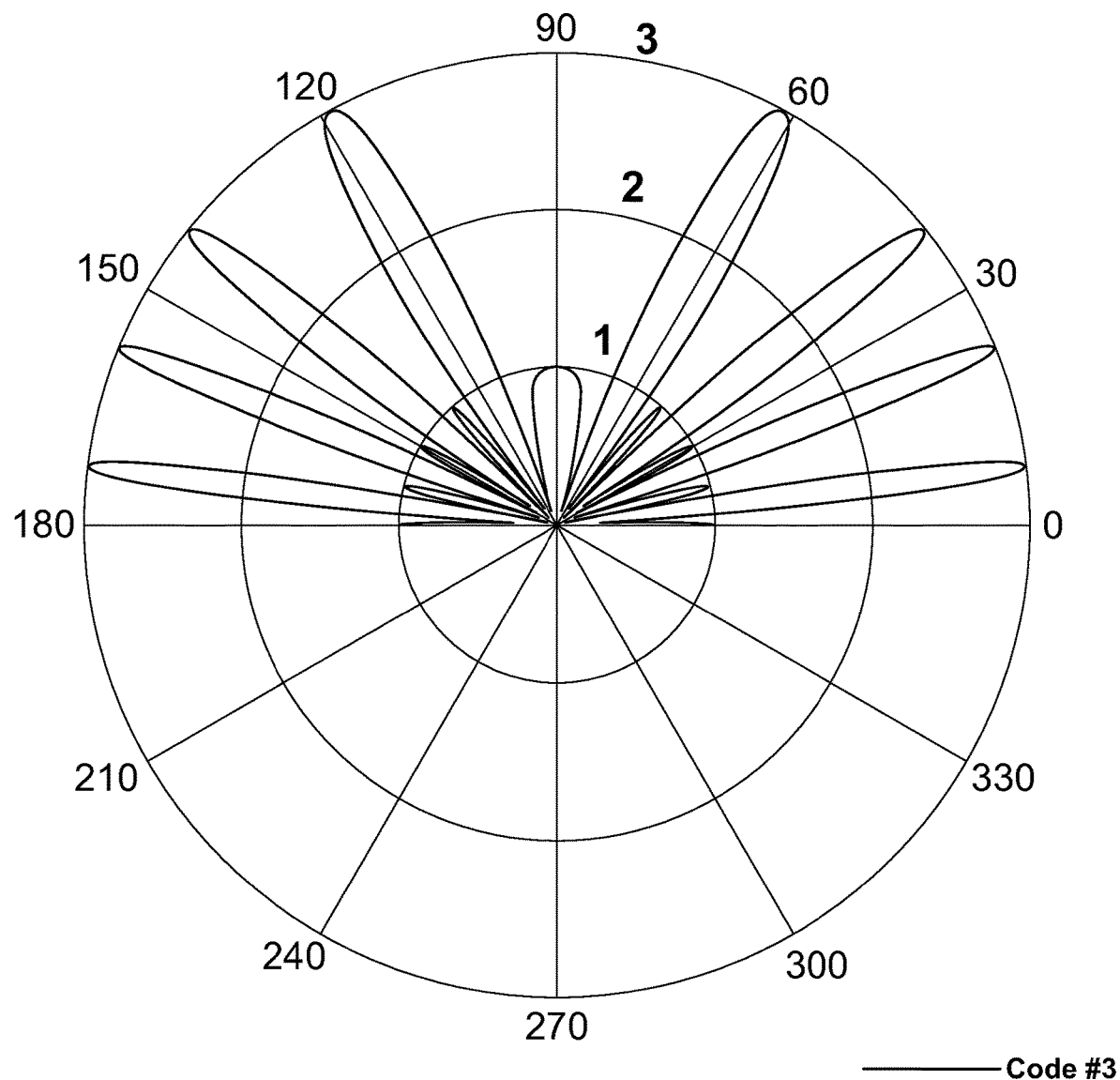
Figure 3D:
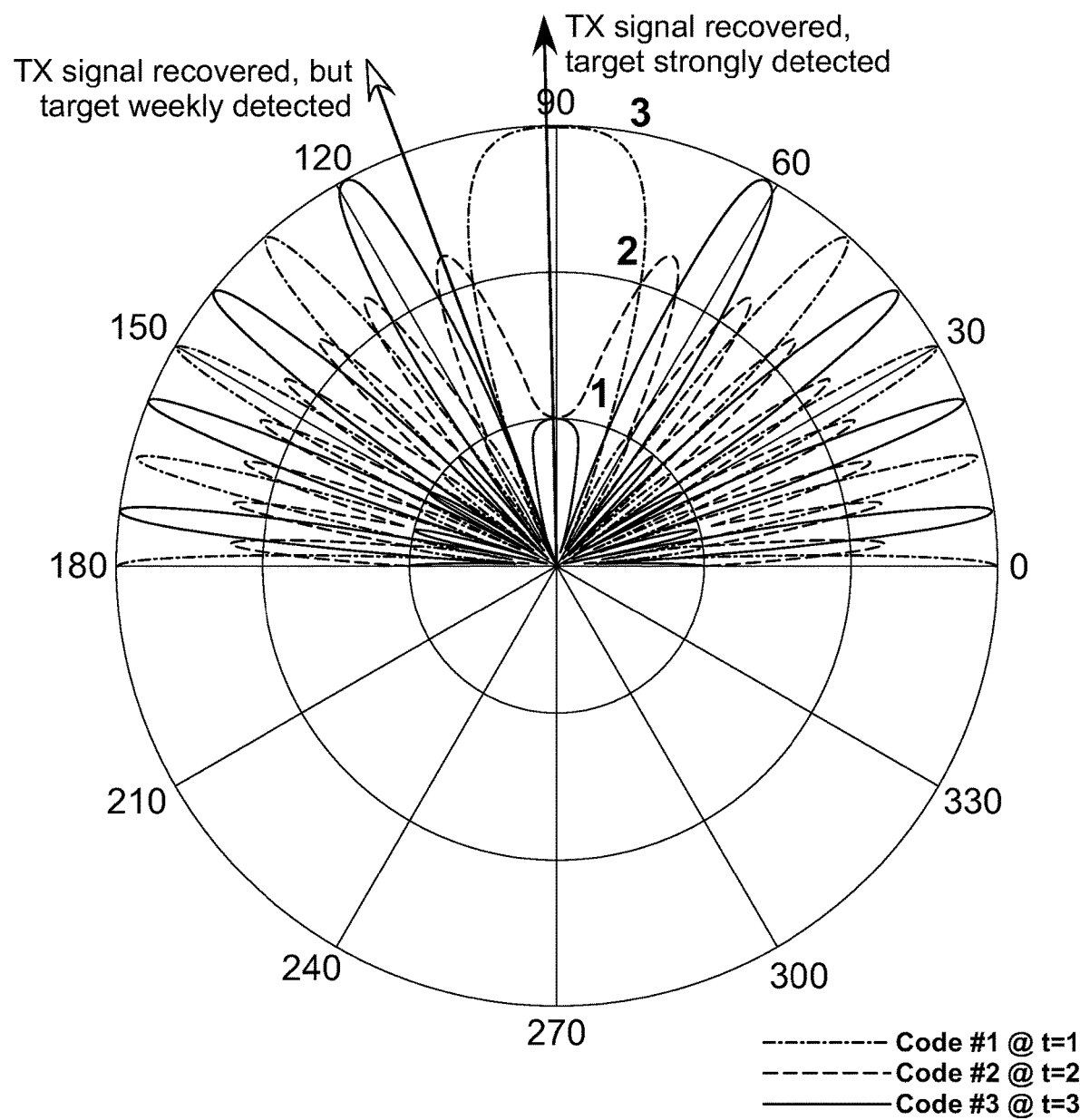
FIG. 3D is a schematic representation of a time-integrated field-of-view of an embodiment of the method.
Figure 4A:
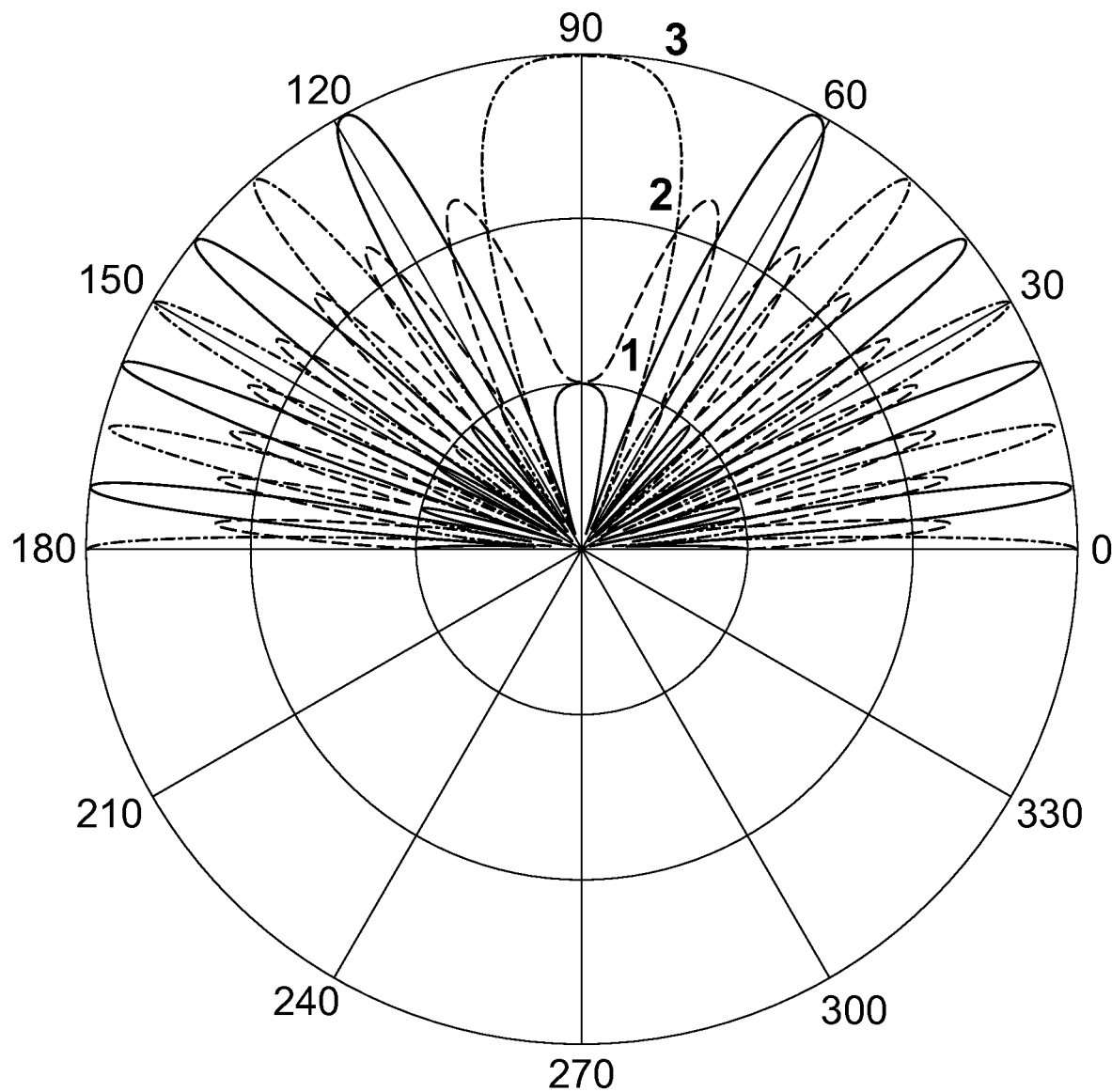
FIGS. 4A-4F are intensity plots of radiation patterns, with various phase shifts, of an embodiment of the method.
Figure 4B:
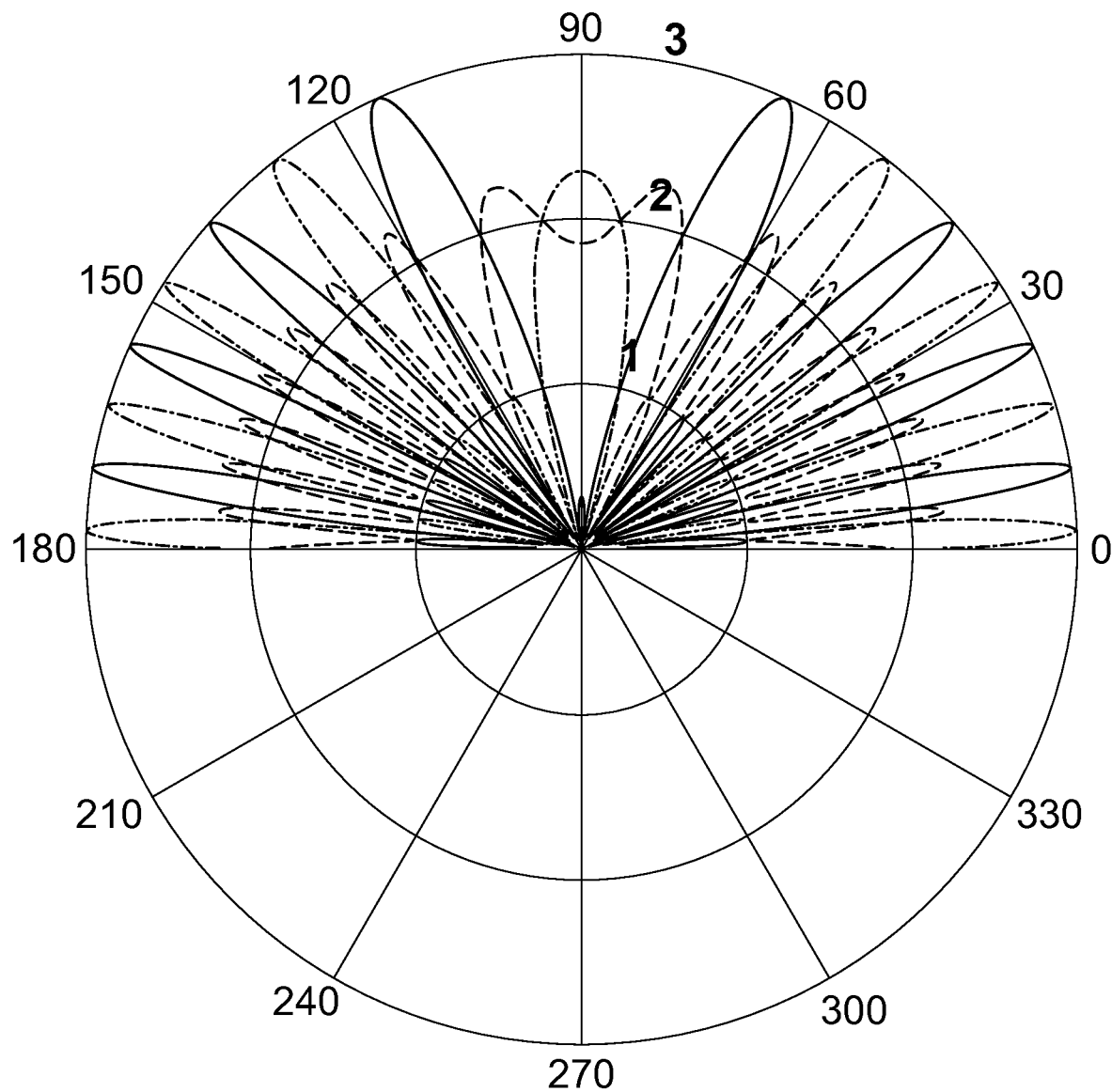
Figure 4C:
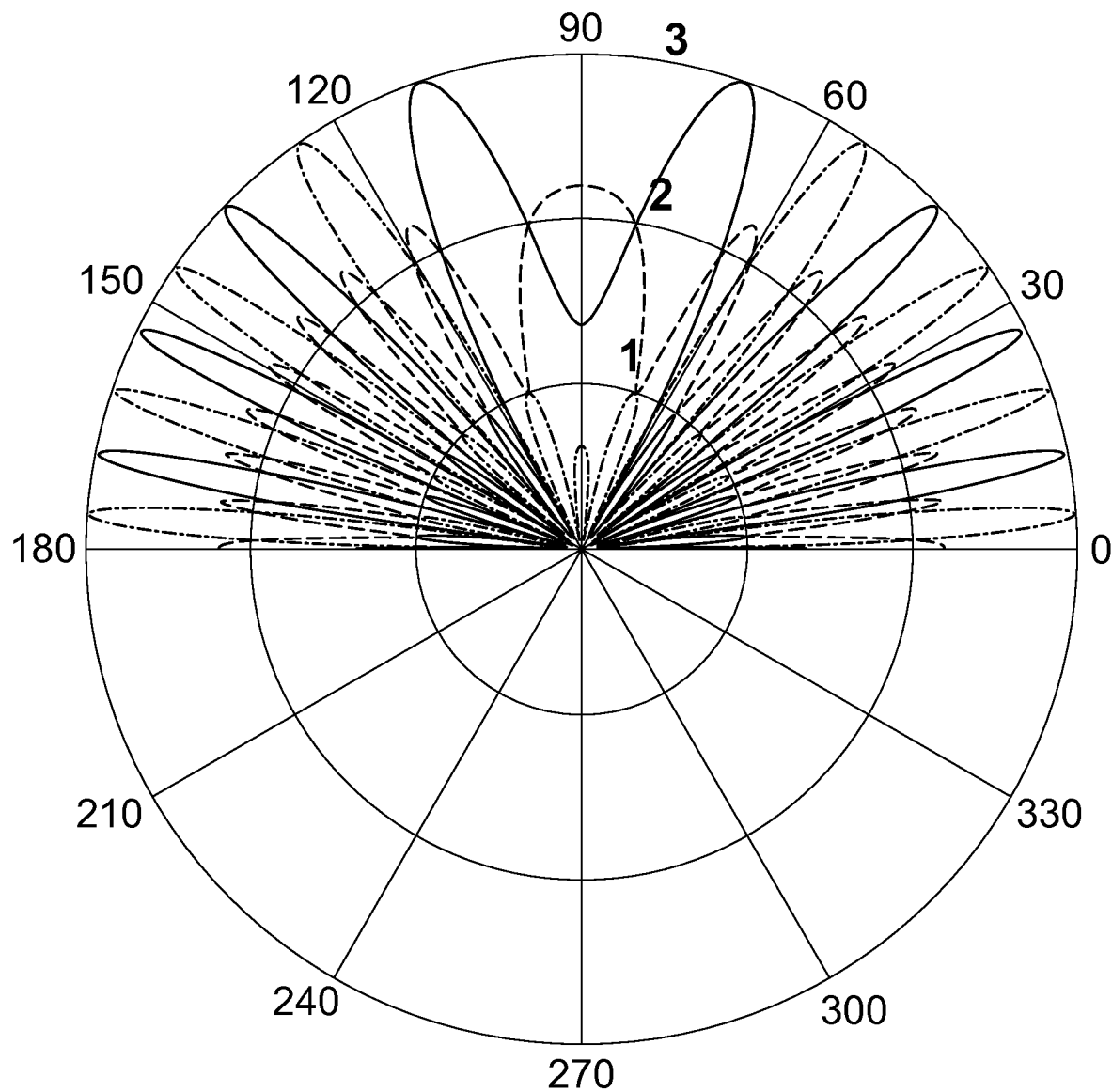
Figure 4D:
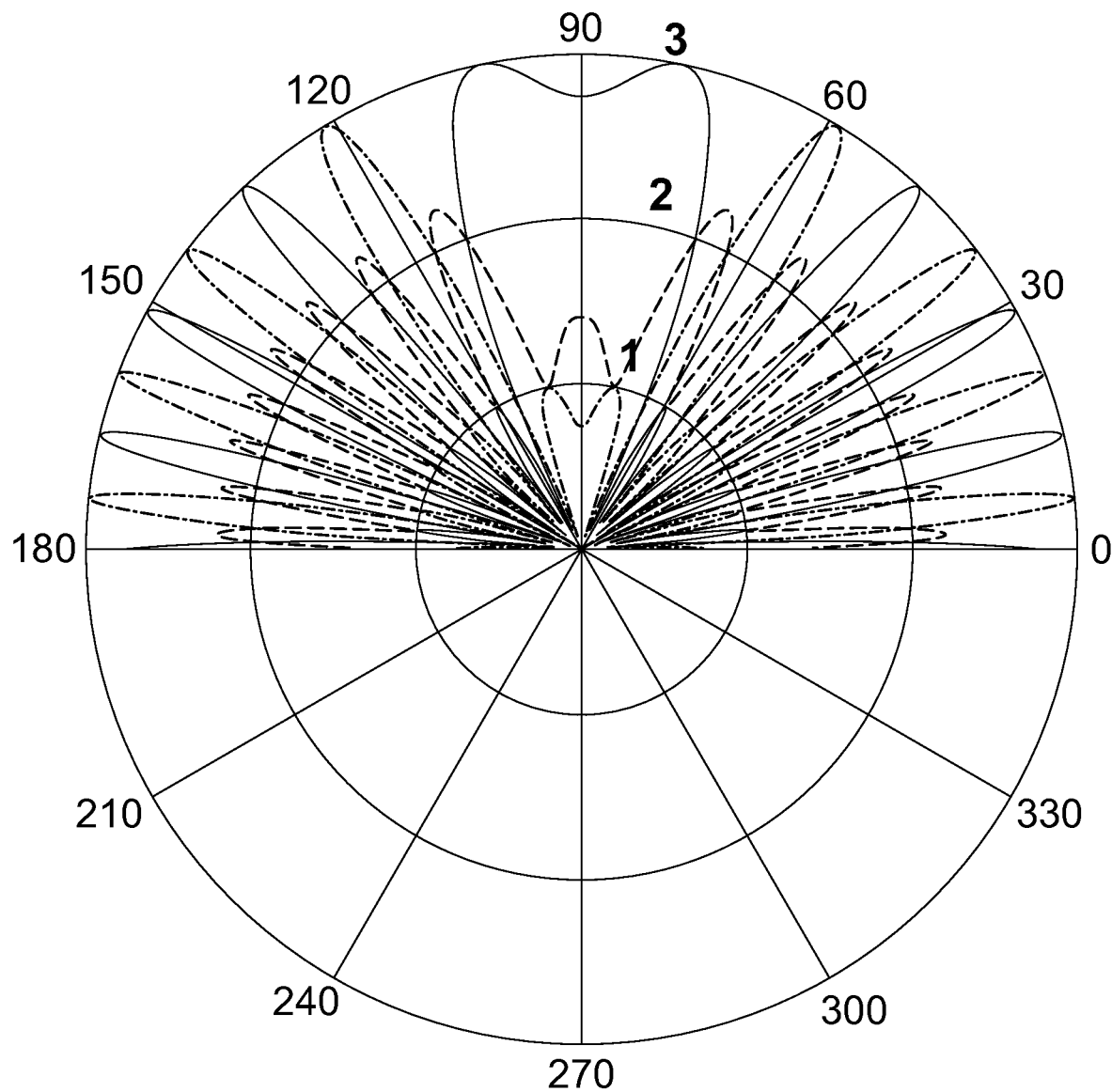
Figure 4E:
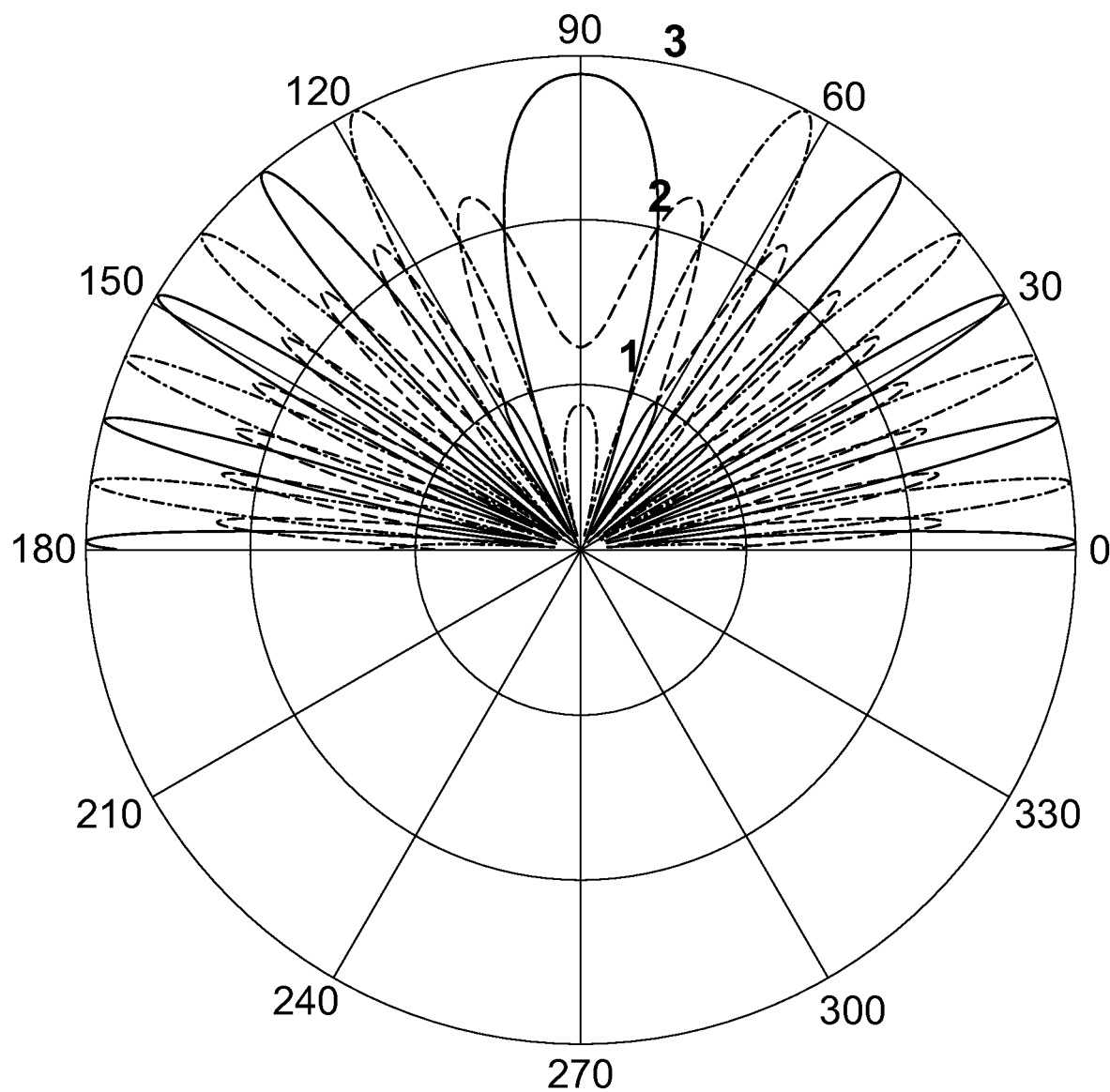
Figure 4F:
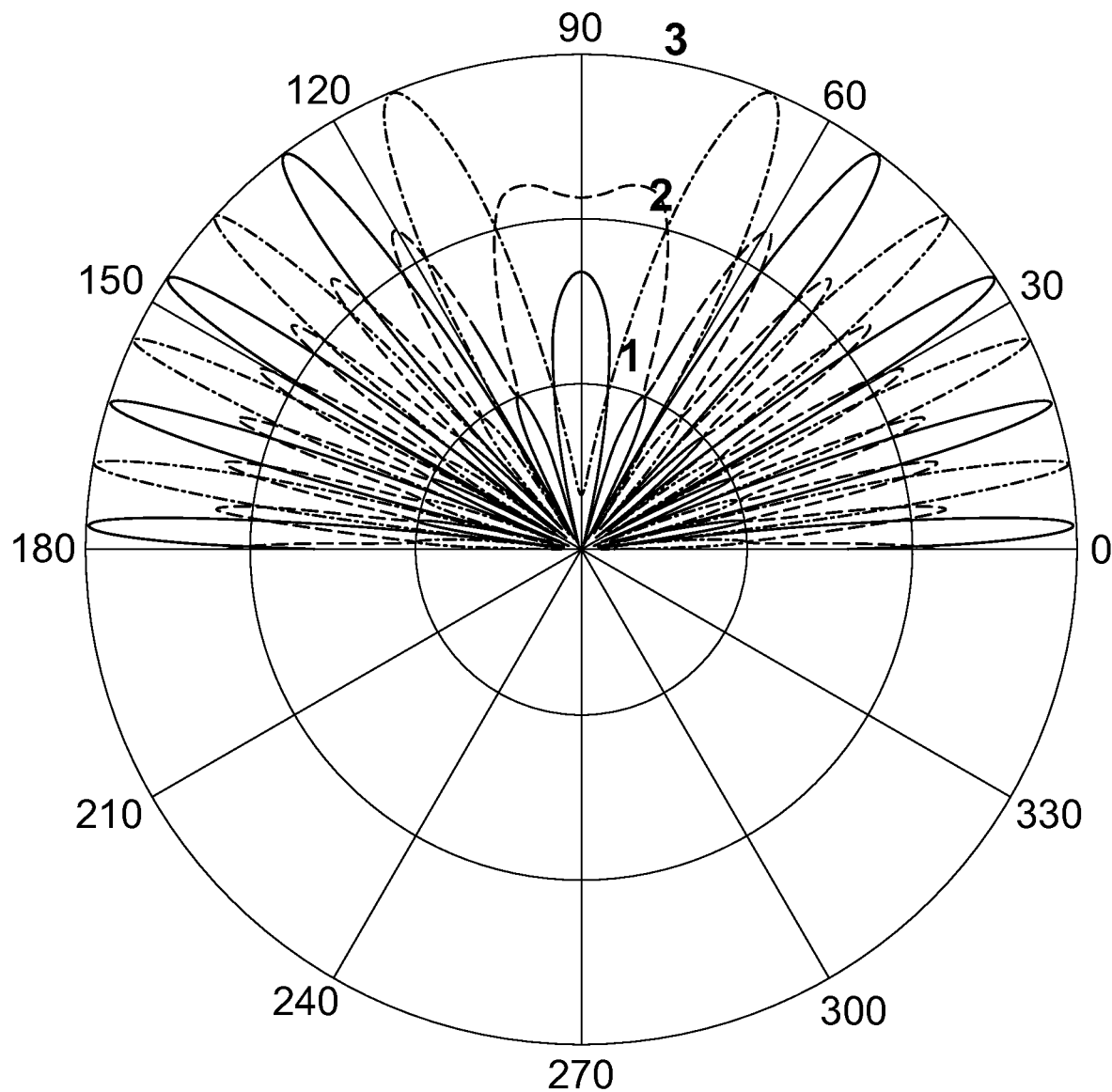

In one example, the method 100 is implemented using a radar system that includes 3 transmitter elements. In this example, each signal group includes three different probe signals encoded using binary phase modulation (optionally with some additional phase variance): a first signal in which all three transmitters transmit in phase, a second signal in which the third transmitter is substantially 180° out of phase with the first and second transmitters, and a third signal in which the second transmitter is substantially 180° out of phase with the first and third transmitters (e.g., for zero additional phase variance, generating radiation patterns such as shown in FIGS. 3A-3C, respectively). S110 preferably includes transmitting the first signal at a first time, transmitting the second signal at a second time after the first time, and transmitting the third signal at a third time after the second time (accordingly, S120 will preferably include, at each receiver element of the system, receiving the first reflected signal $S_1$, then the second reflected signal $S_2$, and then the third reflected signal $S_3$), such as shown in FIG. 3D. In this example, S130 can include determining transmitter-specific signals (e.g., neglecting the additional phase variance) as follows: the first transmitter-specific signal is substantially equal to $$\frac{S_2 + S_3}{2},$$

the second transmitter-specific signal is substantially equal to $$\frac{S_1 - S_3}{2},$$

and the third transmitter-specific signal is substantially equal to $$\frac{S_1 - S_2}{2}.$$

In some specific examples in which additional phase variance is imposed on the transmitted probe signals (e.g., substantially following beam steering solutions), the radiation patterns generated by the three transmitted signals can include patterns such as shown in FIGS. 4A-4F (e.g., corresponding to different beam steering angles between 0 and 10°).

S130 is preferably performed using all signals from a signal group (e.g., performed separately for each signal group). However, S130 can alternatively be performed using multiple signal groups (e.g., an entire frame), using a subset of a single signal group, and/or using any other suitable signals.

The decoded signals can be used to determine information (e.g., relative position and/or velocity) about one or more of the targets from which the probe signals were reflected. For example, this information can be determined such as described in U.S. patent application Ser. No. 16/704,409, filed 5, Dec. 2019 and titled "Systems and Methods for Interpolated Virtual Aperture Radar Tracking", and/or in U.S. patent application Ser. No. 17/117,960, filed 10, Dec. 2020 and titled "Systems and Methods for Virtual Doppler and/or Aperture Enhancement", each of which is herein incorporated in its entirety by this reference (e.g., as described in U.S. patent application Ser. No. 16/704,409 with respect to calculating initial tracking parameters S130 and/or refining the initial tracking parameters S140, as described in U.S. patent application Ser. No. 17/117,960 regarding analyzing received probe signals S130, etc.). The information is preferably determined based on the decoded signals. The information can include, for each target (or a subset thereof), Doppler information (e.g., range rate), heading (e.g., angle or angles, such as azimuthal and elevation angle), range, and/or any other suitable information associated with the target(s). The information is preferably determined based on data from one frame, but can additionally or alternatively be determined using any other suitable number of decoded signals.

S130 can additionally or alternatively include decoding the set of received probe signals in any other suitable manner, and the method can additionally or alternatively include determining any other suitable information using the decoded signals.

The method preferably includes performing S110, S120, and S130 (or a subset thereof) repeatedly, such as performing them continuously. However, the method can additionally or alternatively include performing these elements with any other suitable timing.

2.4 Evaluating Effects of Phase Variance.

Evaluating effects of phase variance S140 preferably functions to determine if the imposed phase variance is sufficient (e.g., sufficient to enable use of a particular array multiplication factor without introducing unacceptable noise and/or artifacts). S140 preferably includes assessing the variance of the received (still-encoded) probe signals. For example, S140 can include assessing the variance between probe signals of a frame, between signals of multiple frames, between signals of a subset of a single frame, and/or between any other suitable signals. In some examples, the received signals are assessed alone, whereas in other examples, they are compared to the decoded signals.

In one embodiment, S140 includes assessing Doppler value variance. In this embodiment, the received (still-encoded) signals are analyzed to determine the associated Doppler values. The received signals are preferably analyzed as if they were decoded signals (e.g., as described above regarding determining information based on decoded signals). In some such examples, all the Doppler values determined from the received signals are assigned to different bins (e.g., defining a Doppler histogram), and the number of occupied bins is assessed as a representation of Doppler value variance.

A first example of this embodiment includes determining whether there is a sufficiently large number of substantially different Doppler values represented by the received signals. For example, this can include determining whether the number of occupied bins in the Doppler histogram is greater than a threshold number.

A second example of this embodiment includes determining if the imposed phase variance (e.g., the encoding and/or the additional phase variance) causes a sufficient increase in Doppler value variance, such as a sufficient increase in the number of substantially different Doppler values (e.g., wherein each Doppler value derived from the decoded signals spreads into multiple substantially different values derived from the encoded signals, such as spreading into a different value associated with each of the encoded signals). In this example, the determination can be made based on a relative or absolute change in the number of Doppler values. For example, the change in the number of occupied Doppler value bins can be compared to a threshold value, such as a relative threshold (e.g., factor by which the number of occupied bins increases) or an absolute threshold (e.g., total number of additional occupied bins). Alternatively, the extent of spreading for individual tracked targets can be evaluated. For example, this can include, for each target that can be sufficiently tracked using information other than the Doppler information (or for a subset of such targets), evaluating the amount of spreading (e.g., based on descriptive statistical metrics, such as range, deviation, distance between percentiles such as between the first and third quartiles, etc.) observed for the Doppler values of returns reflected from the target. In a specific example, for a target with a true radial velocity of v (e.g., wherein the target is stationary with respect to the environment, and the system egovelocity results in a relative radial velocity of v), and for which the decoded data includes Doppler values that represent a tight distribution around v (e.g., range or standard deviation less than a threshold amount, such as 0.05 v), the spreading may result in Doppler values that represent a wide distribution of radial velocities (e.g., range or standard deviation substantially greater than the threshold amount, such as greater than 0.1V, 0.2V, 0.5 v, etc.).

In this embodiment, the threshold value (e.g., associated with determining that the imposed phase variance is sufficient) is preferably dependent on egovelocity (i.e., velocity of the system or of elements thereof). In one example, when egovelocity is low or substantially zero (e.g., the system is substantially at rest), a lower threshold value can be used, such as wherein the histogram uses a narrower bin width and/or a lower total number or fraction of the bins are required to be occupied in order to satisfy the threshold. Whereas, in this example, for a high or substantially non-zero egovelocity (e.g., representing the system being in motion), a higher threshold can be used, such as wherein the histogram uses wider bins and/or a greater number or fraction of bins can be required to be occupied to meet the threshold. The egovelocity can be determined by the velocity sensing module 250, determined based on radar data (e.g., previously sampled and/or analyzed radar data, analysis of the decoded signals corresponding to the signals presently being assessed, etc.), and/or determined in any other suitable manner. However, the threshold can additionally or alternatively be dependent on any other suitable information.

However, the variance in Doppler values can additionally or alternatively be assessed in any other suitable manner. Further, S140 can additionally or alternatively include evaluating the effects of the imposed phase variance based on any other suitable metrics and/or in any other suitable manner.

The method preferably includes performing S140 repeatedly (e.g., for every frame, for all transmitted and/or received signals, etc.). S140 is preferably performed concurrently with S110, S120, and/or S130, but can additionally or alternatively be performed at any other suitable times and/or with any other suitable timing.

2.5 Modifying Probe Signal Characteristics.

Modifying probe signal characteristics S150 preferably functions to dynamically adjust transmitter operation. S150 can be performed based on information determined from the received probe signals, changing operational requirements, and/or any other suitable information. S150 can include changing the phase shifts imposed on the transmitted probe signals, such as changing the phase encodings (e.g., binary phase modulation) and/or additional phase variance (e.g., phase shift sequences), but can additionally or alternatively include changing any other suitable characteristics of the transmitted probe signals (e.g., chirp bandwidth, start frequency, idle time, etc.).

If the effects of the imposed phase variance are determined (e.g., in S140) to be sufficient (e.g., resulting in sufficient Doppler spread), the method preferably includes continuing to perform S110 without changing the phase shift sequence. Alternatively, if the effects of the imposed phase variance are determined to be insufficient, the method can include switching to different phase encodings and/or phase shift sequences (preferably, then performing S140 again to assess the new imposed phase variance). However, the phase encodings and/or phase shift sequences can additionally or alternatively be changed in any other manner and/or based on any other suitable criteria.

S150 can additionally or alternatively include changing the frame size, changing the array multiplication factor, and/or changing any other suitable characteristics of the probe signals and/or probe signal sequences. For example, these characteristics can be changed based on latency requirements, relative target velocities, current and/or desired array multiplication factors, target counts (e.g., the number of targets off of which probe signals are reflected and received), and/or any other suitable metrics. Increasing the frame size can accommodate higher array multiplication factors and/or greater numbers of targets, but typically results in increased latency and/or requires lower relative target velocities (e.g., to ensure that the relative position of the targets is substantially constant across the duration of the frame). In contrast, reducing the frame size can reduce latency and/or increase compatibility with higher relative target velocities, but will typically require lower array multiplication factors and/or a lower target count.

However, S150 can additionally or alternatively include modifying any other probe signal characteristics in any suitable manner based on any suitable criteria.

The method 100 can additionally or alternatively include one or more elements such as described in U.S. patent application Ser. No. 16/704,409, filed 5, Dec. 2019 and titled "Systems and Methods for Interpolated Virtual Aperture Radar Tracking", and/or in U.S. patent application Ser. No. 17/117,960, filed 10, Dec. 2020 and titled "Systems and Methods for Virtual Doppler and/or Aperture Enhancement", each of which is herein incorporated in its entirety by this reference (e.g., as described in U.S. patent application Ser. No. 16/704,409 regarding VAA and/or IVAA radar tracking, calculating initial tracking parameters S130, refining the initial tracking parameters S140, modifying probe signal characteristics S150, and/or any other suitable elements of the method 100; as described in U.S. patent application Ser. No. 17/117,960 regarding analyzing received probe signals S130 and/or any other suitable elements of the method 100; etc.).

However, the method 100 can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGS. illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

The invention claimed is:

1. A method for radar detection, comprising:
   at a set of transmit elements of a radar array, the set comprising a first transmit element and a second transmit element, transmitting a first code-division multiplexed set of radar probe signals, comprising:
      based on a first encoding, transmitting a first encoded set of radar probe signals; and
      substantially concurrent with transmitting the first encoded set, transmitting a second encoded set of radar probe signals;
   at a receiver of the radar array, receiving a first set of reflected signals generated by reflection of the first code-division multiplexed set from at least one target in an environment surrounding the radar array;
   based on the first encoding, demultiplexing the first set of reflected signals to generate a first decoded set of signals and a second decoded set of signals;
   at the set of transmit elements, transmitting a second code-division multiplexed set of radar probe signals phase shifted from the first code-division multiplexed set based on a first set of phase variances, wherein transmitting the second code-division multiplexed set comprises:
      based on the first encoding and the first set of phase variances, transmitting a third encoded set of radar probe signals; and
      substantially concurrent with transmitting the third encoded set, transmitting a fourth encoded set of radar probe signals;
   at a receiver of the radar array, receiving a second set of reflected signals generated by reflection of the second code-division multiplexed set from the at least one target;
   based on the first encoding, demultiplexing the second set of reflected signals to generate a third decoded set of signals associated with the first transmit element and a fourth decoded set of signals; and based on the first, second, third, and fourth decoded sets, determining target location information associated with the at least one target.

2. The method of claim 1, wherein the target location information is associated with an interpolated virtual receive element location.

3. The method of claim 2, further comprising, based on the first and second decoded sets of signals, determining target location information associated with a first receive element location and a second receive element location, wherein:
the first and second receive element locations define a first reference axis, wherein the first and second receive element locations are arranged along the first reference axis; and
the interpolated virtual receive element location is arranged along the first reference axis between the first receive element location and the second receive element location.

4. The method of claim 3, wherein:
the first receive element location is located at a physical receive element of the receiver; and
the second receive element location is located at a virtual receive element defined by a radar system.

5. The method of claim 4, wherein:
the radar array defines a first displacement vector from the first transmit element to the second transmit element; and
the virtual receive element is displaced from the physical receive element by the first displacement vector.

6. The method of claim 5, wherein:
the first and second code-division multiplexed sets of radar probe signals define a radar wavelength; and
a length of the first displacement vector is substantially greater than half the radar wavelength.

7. The method of claim 6, wherein a distance between the physical receive element and the interpolated virtual receive element location is substantially equal to half the radar wavelength.

8. The method of claim 5, wherein:
the first encoded set is transmitted at the first transmit element; and
the second encoded set is transmitted at the second transmit element.

9. The method of claim 8, wherein:
the third encoded set is transmitted at the first transmit element; and
the fourth encoded set is transmitted at the second transmit element.

10. The method of claim 5, wherein:
the third encoded set is transmitted at the first transmit element; and
the fourth encoded set is transmitted at the second transmit element.

11. The method of claim 3, wherein:
the first receive element location is located at a first physical receive element of the receiver; and
the second receive element location is located at a second physical receive element of the receiver.

12. The method of claim 3, wherein:
demultiplexing the first set of reflected signals further generates a fifth decoded set of signals;
demultiplexing the second set of reflected signals further generates a sixth decoded set of signals;

the method further comprises, based on the fifth decoded set, determining target location information associated with a third receive element location;
determining target location information is performed based further on the fifth and sixth decoded sets;
the target location information is further associated with a second interpolated virtual receive element location;
the first and third receive element locations define a second reference axis;
the first and third receive element locations are arranged along the second reference axis;
the first and second reference axes define a non-zero angle between them;
the first and second reference axes define a reference plane; and
the second interpolated virtual receive element location is arranged on the reference plane.

13. The method of claim 2, wherein demultiplexing the first set of reflected signals further generates the third decoded set of signals; the method further comprising, based on the first, second, and third decoded sets, determining target location information associated with a first receive element location, a second receive element location, and a third receive element location, wherein:
the first, second, and third receive element locations define a first reference triangle, wherein the first, second, and third receive element locations are each arranged at a different vertex of the first reference triangle; and
the interpolated virtual receive element location is arranged within the first reference triangle.

14. The method of claim 13, wherein:
the first receive element location is located at a physical receive element of the receiver; and
the second receive element location is located at a first virtual receive element defined by a radar system.

15. The method of claim 14, wherein the third receive element location is located at a second virtual receive element defined by the radar system.

16. The method of claim 1, wherein the first set of phase variances are associated with a first beam steering angle for the set of transmit elements.

17. The method of claim 1, wherein each phase variance of the first set has a respective magnitude less than or equal to 10°.

18. The method of claim 1, wherein the second encoded set of radar probe signals is transmitted based on a second encoding substantially orthogonal to the first encoding.

19. The method of claim 18, wherein the first and second encodings are binary phase modulation encodings.

20. The method of claim 1, further comprising:
determining that a Doppler variance of the first and second sets of reflected signals is less than a threshold value;
in response to determining that the Doppler variance is less than the threshold value:
determining a second set of phase variances, different from the first set of phase variances; and
at the set of transmit elements, transmitting a third code-division multiplexed set of radar probe signals phase shifted from the first code-division multiplexed set based on the second set of phase variances;
at the receiver of the radar array, receiving a third set of reflected signals generated by reflection of the third code-division multiplexed set from the at least one target; and based on the third set of reflected signals, determining refined target information associated with the at least one target.

* * * * *